US006286132B1

(12) United States Patent
Tanaka et al.

(10) Patent No.: US 6,286,132 B1
(45) Date of Patent: Sep. 4, 2001

(54) DEBUGGING SUPPORT APPARATUS, A PARALLEL EXECUTION INFORMATION GENERATION DEVICE, A COMPUTER-READABLE RECORDING MEDIUM STORING A DEBUGGING SUPPORT PROGRAM, AND A COMPUTER-READABLE RECORDING MEDIUM STORING A PARALLEL EXECUTION INFORMATION GENERATION PROGRAM

(75) Inventors: Hirohisa Tanaka, Higashiosaka; Fumio Sumi, Katano; Kensuke Odani, Kyoto; Akira Tanaka, Yawata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/226,228

(22) Filed: Jan. 7, 1999

(30) Foreign Application Priority Data

Jan. 7, 1998 (JP) .................................................. 10-001407

(51) Int. Cl.⁷ ................................. G06F 9/44; G06F 9/38
(52) U.S. Cl. ..................................... 717/4; 717/6; 714/35; 345/346
(58) Field of Search ........................... 717/4, 5, 6; 714/35, 714/38, 46; 345/333, 339, 345, 346

(56) References Cited

U.S. PATENT DOCUMENTS 5,230,050 * 7/1993 Iitsuka et al. ............................. 717/7
5,446,838 * 8/1995 Kimelman .............................. 345/348
5,805,892 * 9/1998 Nakajima .................................. 717/4
5,881,288 * 3/1999 Sumi et al. ................................ 717/4
5,946,493 * 8/1999 Hanson ..................................... 717/9
5,978,584 * 11/1999 Nishibata et al. ........................ 717/4

OTHER PUBLICATIONS

Hall et al., "Experiences Using the ParaScope Editor: an Interactive Parallel Programming Tool," Proceedings of teh Fourth ACM SIGPLAN symposium on Principles & practice of parallel programming, pp. 33–43, May 19–23, 1993.*
Hiranandani et al., "The D Editor: A New Interactive Parallel Programming Tool," Proceedings of the conference on Supercomputing '94, pp. 733–742, Nov. 14–18, 1994.*
Lumetta et al., "The Mantis Parallel Debugger," Proceedings of the SIGMETRICS symposium on Parallel and Distributed Tools, pp. 118–126, May 22–23, 1996.*

* cited by examiner

Primary Examiner—Tuan Q. Dam
(74) Attorney, Agent, or Firm—Price and Gess

(57) ABSTRACT

A debugging support apparatus for a processor that executes a plurality of instructions in parallel displays lines of source code statements in a user program that are executed in parallel. Code execution unit 15 executes the program. When execution of the program is interrupted at a breakpoint set in advance at a line of a source code statement, user interface unit 11 searches parallel execution information storage unit 5 for lines to be executed in parallel with the line set the breakpoint, and displays a source code statement of the line set the breakpoint and source code statements of the lines to be executed in parallel. As a result, a user is able to visually recognize which lines of source code statements are executed in parallel.

20 Claims, 16 Drawing Sheets

FIG. 8A
PROGRAM STORAGE UNIT

```
Line:1    int mem1,mem2;
Line:2    int test()
Line:3    {
Line:4        int a,b,result;
Line:5        a=mem1;
Line:6        b=a+mem2;
Line:7        result=0;
Line:8        for(i=1;i<10;i++)
Line:9        {
Line:10           int x;
Line:11           x=Input Data();
Line:12           x=i* x;
Line:13           result +=x;
Line:14       }
Line:15       result+=2* b;
Line:16       mem1=result;
Line:17       return0;
Line:18   }
```

FIG. 8B
SECOND CODE GENERATION UNIT INPUT

```
       save                          ⎫ Line:2
       mov   (_mem1),r1              ⎫ Line:5
       mov   (_mem2),r2              ⎫ Line:6
       add   r1,r2                   ⎫
       mov   #0,r3                   ⎬ Line:7
       mov   #1,r4                   ⎭
Loop:                                ⎫ Line:8
       cmp   #10,r4                  ⎪
       bge   Exit                    ⎭
       call  _Input Data             ⎫ Line:11
       mul   r4,r1                   ⎫ Line:12
       add   r1,r3                   ⎫ Line:13
       add   #1,r4                   ⎫
       jmp   Loop                    ⎬ Line:8
Exit:
       mul   #2,r2                   ⎫ Line:15
       add   r2,r3                   ⎫
       mov   r3,(_mem1)              ⎬ Line:16
       mov   #0,r1                   ⎭ Line:17
       restore                       ⎫
       return                        ⎬ Line:18
```

FIG. 9A
DEPENDENT RELATION ANALYSIS UNIT INPUT

```
         save
①        mov    (_mem1),r1
②        mov    (_mem2),r2
③        add    r1,r2
④        mov    #0,r3
⑤        mov    #1,r4
⑥  Loop:
⑦        cmp    #10,r4
⑧        bge    Exit
⑨        call   _Input Data
⑩        mul    r4,r1
⑪        add    r1,r3
⑫        add    #1,r4
⑬        jmp    Loop
    Exit:
⑭        mul    #2,r2
⑮        add    r2,r3
⑯        mov    r3,(_mem1)
⑰        mov    #0,r1
⑱        restore
⑲        return
```

FIG. 9B
PROGRAM DIVIDED INTO BASIC BLOCKS

```
         save                    ⎫
         mov    (_mem1),r1       ⎪
         mov    (_mem2),r2       ⎬ BASIC BLOCK B1
         add    r1,r2            ⎪
         mov    #0,r3            ⎪
         mov    #1,r4            ⎭
    Loop:
         cmp    #10,r4           ⎫
         bge    Exit             ⎬ BASIC BLOCK B2
         call   _Input Data      ⎪
         mul    r4,r1            ⎪
         add    r1,r3            ⎬ BASIC BLOCK B3
         add    #1,r4            ⎪
         jmp    Loop             ⎭
    Exit:
         mul    #2,r2            ⎫
         add    r2,r3            ⎪
         mov    r3,(_mem1)       ⎬ BASIC BLOCK B4
         mov    #0,r1            ⎪
         restore                 ⎪
         return                  ⎭
```

DEPENDENCY DAG FOR BASIC BLOCKS
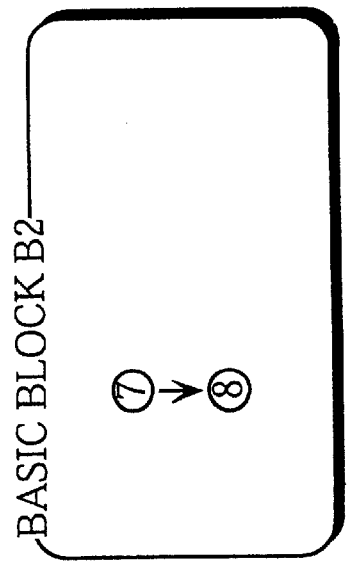
FIG. 10A — BASIC BLOCK B1
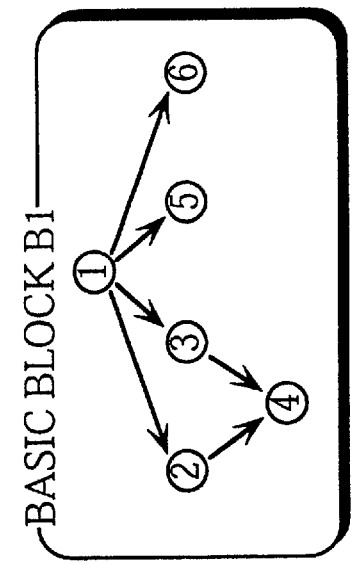
FIG. 10B — BASIC BLOCK B2
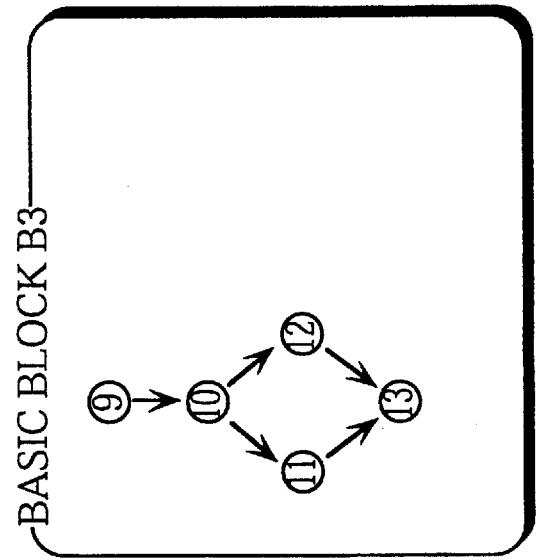
FIG. 10C — BASIC BLOCK B3
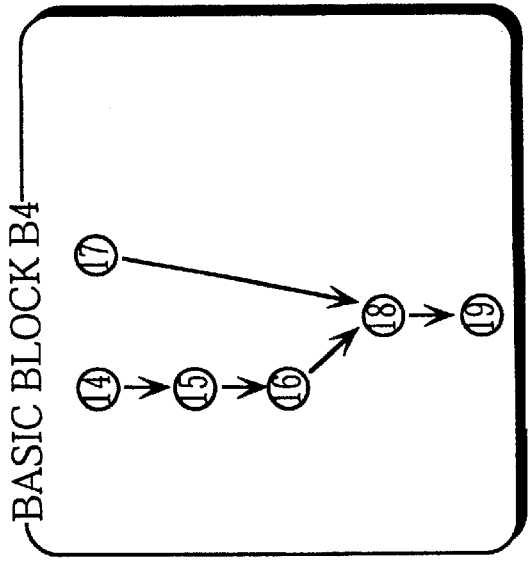
FIG. 10D — BASIC BLOCK B4

FIG. 11

LINE ADDRESS INFORMATION

| LINE NUMBER | ADDRESS |
|---|---|
| Line:2 | 0x100 | ← A
| Line:5 | 0x108 | ← C
| Line:6 | 0x108 | ← D
| Line:7 | 0x110 |
| Line:8 | 0x118 |
| Line:11 | 0x130 |
| Line:12 | 0x138 |
| Line:13 | 0x140 |
| Line:15 | 0x150 |
| Line:16 | 0x160 |
| Line:17 | 0x150 |
| Line:18 | 0x168 |

FIG. 12

PARALLEL EXECUTION INFORMATION

| ADDRESS | PARALLEL EXECUTION LINE INFORMATION | |
|---|---|---|
| 0x100 | Line:2 | |
| 0x108 | Line:5 | Line:6 |
| 0x110 | Line:6 | Line:7 |
| 0x118 | Line:8 | |
| 0x120 | Line:8 | |
| 0x128 | Line:8 | |
| 0x130 | Line:11 | |
| 0x138 | Line:12 | |
| 0x140 | Line:13 | Line:8 |
| 0x148 | Line:8 | |
| 0x150 | Line:15 | Line:17 |
| 0x158 | Line:15 | |
| 0x160 | Line:16 | |
| 0x168 | Line:18 | |
| 0x170 | Line:18 | |

GENERATED CODE STORAGE UNIT

| Addr | Slot 1 | | Slot 2 | |
|---|---|---|---|---|
| 0x100 | save | ① | nop | |
| 0x108 | mov (_mem1),r1 | ② | mov (_mem2),r2 | ③ |
| 0x110 | add r1,r2 | ④ | mov #0,r3 | ⑤ |
| 0x118 | mov #1,r4 | ⑥ | nop | |

Loop:

| Addr | | | | |
|---|---|---|---|---|
| 0x120 | cmp #10,r4 | ⑦ | nop | |
| 0x128 | bge Exit | ⑧ | nop | |
| 0x130 | call _Input Data | ⑨ | nop | |
| 0x138 | mul r4,r1 | ⑩ | nop | |
| 0x140 | add r1,r3 | ⑪ | add #1,r4 | ⑫ |
| 0x148 | jmp Loop | ⑬ | nop | |

Exit:

| Addr | | | | |
|---|---|---|---|---|
| 0x150 | mul #2,r2 | ⑭ | mov #0,r1 | ⑰ |
| 0x158 | add r2,r3 | ⑮ | nop | |
| 0x160 | mov r3,(_mem1) | ⑯ | nop | |
| 0x168 | restore | ⑱ | nop | |
| 0x170 | return | ⑲ | nop | |

FIG. 15A

```
Line:1      int mem1,mem2;
Line:2      int test()
Line:3      {
Line:4          int a,b,result;
Line:5      y2  a=mem1;
Line:6       ⇨  b=a+mem2;
Line:7       ➡  result=0;
Line:8      y1  for(i=1;i<10;i++)
Line:9          {
Line:10             int x;
Line:11             x=Input Data();
Line:12             x=i* x;
Line:13             result +=x;
Line:14         }
```

```
            save                        }Line:2
            mov    (_mem1),r1           }Line:5
            mov    (_mem2),r2           }Line:6
        ⇨   add    r1,r2
        ➡   mov    #0,r3                }Line:7
            mov    #1,r4
Loop:
            cmp    #10,r4               }Line:8
            bge    Exit
            call   _Input Data          }Line:11
            mul    r4,r1                }Line:12
            add    r1,r3                }Line:13
            add    #1,r4
            jmp    Loop                 }Line:8
```

```
>run Line:1
>プログラムを [Line:1] から実行します
>プログラムは [Line:7] [Line:6] にて停止いたしました
>デバッグ用コマンドを入力してください
>ReadVAR a
>変数 [a] の値は [30_A8] です
```

FIG. 15B

```
Line:1      int mem1,mem2;
Line:2      int test()
Line:3      {
Line:4          int a,b,result;
Line:5          a=mem1;
Line:6          b=a+mem2;
Line:7          result=0;
Line:8      ➡   for(i=1;i<10;i++)
Line:9          {
Line:10             int x;
Line:11             x=Input Data();
Line:12             x=i* x;
Line:13             result +=x;
Line:14         }
```

```
            save                        }Line:2
            mov    (_mem1),r1           }Line:5
            mov    (_mem2),r2
            add    r1,r2                }Line:6
            mov    #0,r3                }Line:7
        ➡   mov    #1,r4
Loop:
        ⇨   cmp    #10,r4               }Line:8
        ⇨   bge    Exit
            call   _Input Data          }Line:11
            mul    r4,r1                }Line:12
            add    r1,r3                }Line:13
            add    #1,r4
            jmp    Loop                 }Line:8
Exit:
            mul    #2,r2
            add    r2,r3                }Line:15
            mov    r3,(_mem1)           }Line:16
```

```
>INPUT DEBUGGING COMMAND
>step Line:8
>Line:8 IS TO BE EXECUTED
```

FIG. 16A

```
Line:5      a=mem1;
Line:6      b=a+mem2;
Line:7      result=0;
Line:8      for(i=1;i<10;i++)
Line:9      {
Line:10       int x;
Line:11  →    x=Input Data();
Line:12       x=i* x;
Line:13       result +=x;
Line:14     }
```

```
       bge    Exit
    →  call   _Input Data  } Line:11
       mul    r4,r1        } Line:12
       add    r1,r3        } Line:13
       add    #1,r4
       jmp    Loop         } Line:8
Exit:
       mul    #2,r2        } Line:15
       add    r2,r3
       mov    r3,(_mem1)   } Line:16
```
>INPUT DEBUGGING COMMAND
>step Line:11
>Line:11 IS TO BE EXECUTED

FIG. 16B

```
Line:5      a=mem1;
Line:6      b=a+mem2;
Line:7      result=0;
Line:8      for(i=1;i<10;i++)
Line:9      {
Line:10       int x;
Line:11       x=Input Data();
Line:12  →    x=i* x;
Line:13       result +=x;
Line:14     }
```

```
       bge    Exit
       call   _Input Data  } Line:11
    →  mul    r4,r1        } Line:12
       add    r1,r3        } Line:13
       add    #1,r4
       jmp    Loop         } Line:8
Exit:
       mul    #2,r2        } Line:15
       add    r2,r3
       mov    r3,(_mem1)   } Line:16
```
>INPUT DEBUGGING COMMAND
>step Line:12
>Line:12 IS TO BE EXECUTED

FIG. 16C

```
Line:1      int mem1,mem2;
Line:2      int test()
Line:3      {
Line:4        int a,b,result;
Line:5        a=mem1;
Line:6        b=a+mem2;
Line:7        result=0;
Line:8   ⇒    for(i=1;i<10;i++)
Line:9        {
Line:10         int x;
Line:11         x=Input Data();
Line:12         x=i* x;
Line:13  →      result +=x;
Line:14       }
```

```
       save                 } Line:2
       mov    (_mem1),r1    } Line:5
       mov    (_mem2),r2
       add    r1,r2         } Line:6
       mov    #0,r3         } Line:7
       mov    #1,r4
Loop:
       cmp    #10,r4        } Line:8
       bge    Exit
       call   _Input Data   } Line:11
       mul    r4,r1         } Line:12
    →  add    r1,r3         } Line:13
    ⇒  add    #1,r4
       jmp    Loop          } Line:8
Exit:
       mul    #2,r2         } Line:15
       add    r2,r3
       mov    r3,(_mem1)    } Line:16
```
>INPUT DEBUGGING COMMAND
>step Line:13
>Line:8 AND Line:13 ARE TO BE EXECUTED

DEBUGGING SUPPORT APPARATUS, A PARALLEL EXECUTION INFORMATION GENERATION DEVICE, A COMPUTER-READABLE RECORDING MEDIUM STORING A DEBUGGING SUPPORT PROGRAM, AND A COMPUTER-READABLE RECORDING MEDIUM STORING A PARALLEL EXECUTION INFORMATION GENERATION PROGRAM

This application is based on an application Ser. No. 10-1407 filed in Japan, the content of which is hereby incorporated by reference.

BACKGROUND OF THE INVENTION

1. Field of the Invention

The present invention relates to a debugging support apparatus that supports operation verification for a long word instruction sequence, a parallel execution information generation device that is included in a compiler and used by a debugging support apparatus, a computer-readable recording medium storing a debugging support program, and a computer-readable recording medium storing a parallel execution information generation program.

2. Description of the Background Art

In recent years, parallel execution methods have been widely used in the development of microprocessors. Parallel execution means to execute a plurality of instructions in parallel in one machine cycle, and is typically achieved by superscalar methods and VLIW (Very Long Instruction Word) methods.

With superscalar methods, dedicated circuits inside the processor dynamically analyze instructions that can be executed in parallel,.and then these instructions are separately executed by a plurality of instruction execution units.

Superscalar methods have an advantage of being compatible with serial execution methods. That is, a processor that uses a superscalar method can execute object code that a compiler generates for a processor that uses a serial execution method. On the other hand, superscalar methods have a disadvantage in that a processor needs to includes the dedicated hardware used to analyze the instructions that are executed in parallel, which results in increasing hardware costs.

With VLIW methods, the word length of the processor is set based on an integral multiple of the word length of instructions generated as object code. In this specification, an instruction indicated by object code is called an object code instruction to distinguish it from a VLIW instruction. One VLIW instruction includes a plurality of object code instructions that can be executed in parallel, and these object code instructions are separately executed by a plurality of instruction execution units. Here, the processing that analyzes which object code instructions can be executed in parallel and inserts object code instructions into VLIW instructions is called scheduling.

With VLIW methods, the processor does not need to judge it a group of instructions can be executed in parallel when executing the instructions, so that hardware reduction can be made. However, when all the storage areas in one VLIW instruction can't be filled with object code instructions, as often happens, nop code instructions are inserted into the areas where no object code instruction is placed, This has a drawback in that the total code size increases by the size of the inserted nop code instructions, which in turn leads to an increase in memory size.

Such a disadvantage, however, can be reduced by improving the method for inserting object code instructions into VLIW instructions so that less nop code instructions are used. Therefore, in terms of reducing hardware costs, the VLIW method can be considered more promising.

With the VLIW method, a compiler performs the scheduling. This means that the compiler determines which object code instructions should be placed into each VLIW instruction. As the analysis of parallelism and scheduling of object code instructions by compilers becomes increasingly advanced, the resulting VLIW instruction sequence is becoming increasingly removed from the source program written by a programmer.

As a result, when a programmer runs a VLIW instruction sequence on a target machine, it is difficult for the programmer to grasp the correspondence between the object code instructions that are executed in parallel by the VLIW processor and the source code instructions in the programmer's source program. Programmers are often unable to understand which group of source code instructions are being executed in parallel. Accordingly, when an error is detected during operation verification, the programmer can have problems in ascertaining which source code instruction in a source program caused the error. This leads to the problem of debugging taking a long time.

High-level language-oriented developments, where every development stage from the program coding to operation verification on the target appliance is performed using a high-level language, have been subject to increasing attention. Since VLIW instructions are written in object code, however, the programmer may be unable to ascertain which source code instruction in a source program is the cause of an error. In this case, the programmer has to correct the error by directly rewriting the code in the VLIW instructions, such as by applying a patch. This means that the benefits of a high-level language-oriented development environment cannot be obtained.

SUMMARY OF THE INVENTION

The object of the present invention is to provide a debugging support apparatus and a parallel execution information generation device with which the user can find a cause of an error at the source program level during operation verification for a VLIW sequence, even when a significant gap exists between the source program written by a programmer and the VLIW instruction sequence produced from the source program.

The above object can be achieved by the debugging support apparatus of claim 1.

According to claim 1, the debugging support apparatus supports operation verification by a user for a long word instruction sequence containing at least one long word instruction, including: a first storage unit for storing sets of parallel execution information that each contain a long word instruction address and a group of line numbers that each specify a source code statement in a source program, wherein source code statements specified by the group of line numbers can be executed in parallel and have been placed into the long word instruction after being translated into object code; a reception unit for receiving from a user an operation verification command that designates a line number specifying a source code statement; a reading unit for reading, when a set of parallel execution information that contains the designated line number exists, the set of parallel execution information from the first storage unit; and a display unit for visually indicating at least one source code statement specified by a line number in the read set of parallel execution information aside from the designated line number.

As a result, even when a significant gap exists between the source program written by a programmer and a VLIW instruction sequence converted from the source program, the programmer can soon understand which source code statements are executed in parallel. Accordingly, debugging can be performed more efficiently when an error is detected in a VLIW instruction sequence during operation verification, since the programmer can easily detect the source code statement that causes the error.

Here, the display unit may include: a first list display unit for displaying a first program list that contains the source code statement specified by the designated line number; a second list display unit for displaying a second program list that contains a source code statement specified by a line number in the read set of parallel execution information aside from the designated line number; and a modification unit for modifying a display by the second list display unit of the source code statement that is specified by the line number in the read set of parallel execution information.

Accordingly, a programmer is made aware of which source code statements are being performed in parallel, and can perform the debugging more efficiently when an error is detected in a VLIW instruction sequence during operation verification, as the programmer can easily detect the source code statement that causes the error.

Consequently, even when object code instructions generated by the compiler are inserted into a VLIW instruction sequence, a "high-level language-oriented development environment", where every stage from the coding of the program to operation verification on the actual appliance is performed using a high-level language, can be achieved.

Here, the debugging support apparatus may include an execution control unit for having a processor execute a long word instruction, wherein the modification unit in the display unit may modify displays of different source code statements as execution of the long word instruction sequence by the processor proceeds.

This allows the programmer to review the source program he or she wrote for errors while having the VLIW instruction sequence executed by the processor.

Here, one kind of operation verification command may be an execution command that has the long word instruction sequence executed, the execution command designating a line number of a source code statement as a start line for execution of the long word instruction sequence, wherein the reading unit may read a set of parallel execution information containing the line number designated as the start line from the first storage unit, wherein the modification unit may modify, in program lists, a display of source code statements specified by line numbers in the read set of parallel execution information, wherein the execution control unit may have the processor execute the long word instruction sequence starting from a long word instruction that corresponds to the line number designated as the start line.

Accordingly, even a programmer unfamiliar with VLSIW instructions can easily process the VLIW instruction sequence.

Here, another kind of operation verification command may be a breakpoint setting command that has a breakpoint set at a line number, wherein the debugging support apparatus may include a breakpoint setting unit for setting a breakpoint at a long word instruction address associated by a set of parallel execution information with the line number to be set a breakpoint, wherein the modification unit may modify, when execution of the long word instruction sequence is interrupted by the breakpoint set by the breakpoint setting unit, a display of source code statements specified by line numbers in the set of parallel execution information.

Therefore, the user can easily investigate which source code statement causes an error by having the VLIW sequence executed until a point located immediately before a source code statement considered to be the cause of the error.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8A shows the stored contents of the program storage unit;

FIG. 8B shows the input code for second code generation unit 9;

FIG. 9A shows the input code for dependent relation analysis unit 8;

FIG. 9B shows the states after the input code shown in FIG. 9A are grouped in units of basic blocks;

FIG. 10A shows the DAG (directed acyclic graph) for basic block B1.

FIG. 10B shows the DAG for basic block B2.

FIG. 10C shows the DAG for basic block B3.

FIG. 10D shows the DAG for basic block B4.

FIG. 11 shows the stored contents of line address storage unit 4;

FIG. 12 shows the stored contents of parallel execution information storage unit 5;

FIG. 13 shows the stored contents of generated code storage unit 2;

FIG. 15A shows a display screen when program execution is interrupted by a breakpoint set by a user in the embodiment of the present invention;

FIG. 15B shows a display screen in which lines to be executed in parallel are indicated when a Step command is to be executed; and FIGS. 16A–16C show display screens in which lines to be executed in parallel are indicated when Step commands are to be executed.

DESCRIPTION OF THE PREFERRED EMBODIMENTS

Figure 1:
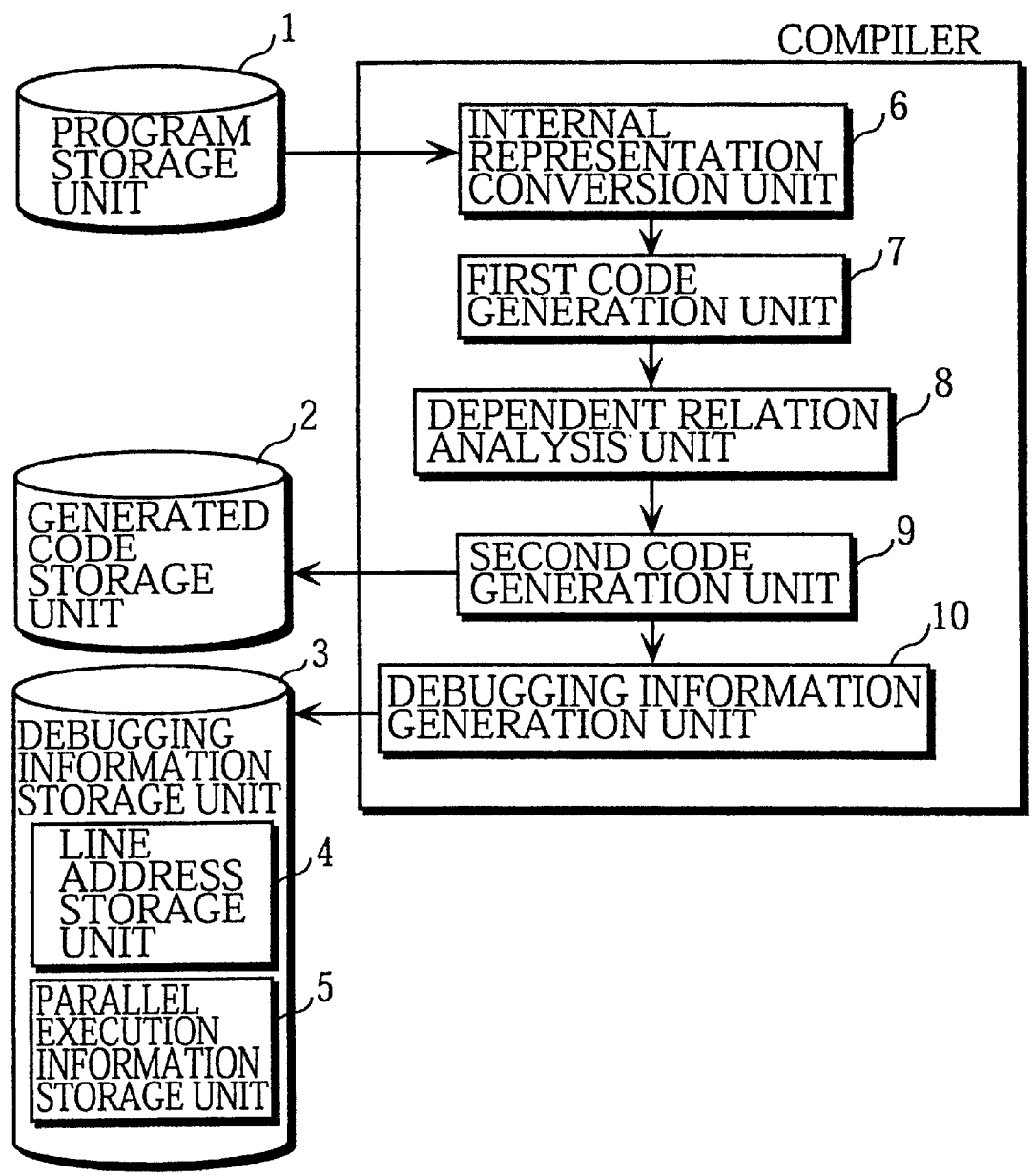
FIG. 1 shows a construction of a compiler in the embodiment of the present invention.

The following explains, with reference to drawings, embodiments of a compiler that includes a parallel execution information generation device of the present invention, and a debugging support apparatus. FIG. 1 shows the construction of a compiler that includes the parallel execution information generation device.

As shown in FIG. 1, the compiler includes: program storage unit 1; generated code storage unit 2; debugging information storage unit 3; internal representation conversion unit 6; first code generation unit 7; dependent relation analysis unit 8; second code generation unit 9; and debugging information generation unit 10.

Program storage unit 1 stores a source program. An example of a source program stored in program storage unit 1 is shown in FIG. 8A. This source program is used to explain the operation of the present invention.

Internal representation conversion unit 6 reads a source program from program storage unit 1, and converts it into a program written in internal representation that can be used by the compiler.

This internal representation conversion unit 6 does not constitute the gist of the present invention, and so will not be described.

First code generation unit 7 optimizes the internal representation that has been produced by internal representation conversion unit 6. First code generation unit 7 then generates an object code sequence. FIG. 8B shows object code instructions generated from source code instructions hereafter called source code statements shown in FIG. 8A. A group of object code instructions indicated in FIG. 8B by a mark "}" and a line number corresponds to a source code statement in FIG. 8A that has the same line number.

Here, first code generation unit 7 does not constitute the gist of the present invention, and so will not be explained.

Dependent relation analysis unit 8 analyzes the dependent relations between object code instructions that have been optimized by first code generation unit 7. Here, dependent relations refer to potential ordering scheduling limitations that exist between different instructions, that are written in object code, regarding the use of a resource. For instance, in an example shown in FIG. 9A, where the instruction number assigned to each instruction is shown by a circled figure, a potential ordering scheduling limitations exist between the operation of register r1 specified by instruction2:"mov (_mem1),r1" and the operation of register r1 specified by instruction4:"add r1,r2" in that instruction4:"add r1,r2" uses a value of register r1 that is defined by instruction2:"mov (_mem1),r1".

When a potential ordering scheduling limitation exists as with instruction2:"mov (_mem1),r1" and instruction4:"add r1,r2", a directed link called a directed line is formed between these instructions, and potential ordering scheduling limitations between a plurality of instructions are expressed by generating a directed acyclic graph (DAG).

FIGS. 10A–10D show DAGs for the instructions included in each basic block shown in FIG. 9B. These DAGs are obtained by linking instructions with directed lines. When a directed line is not formed between any two instructions in a DAG generated by dependent relation analysis unit 8, it means that the two instructions have no dependent relation concerning the use of a resource. Such instructions that clearly have no dependent relation may be executed in parallel without affecting the operation of the program.

Based on dependent relation information obtained by dependent relation analysis unit 8, second code generation unit 9 places object code instructions, which have been generated by first code generation unit 7, into VLIW instructions to generate a VLIW instruction sequence. In the DAG shown in FIG. 10A, directed lines are formed between instruction1:"save" and instruction2:"mov (_mem1),r1" as well as between instruction1:"save" and instruction3:"mov (_mem2), r2". However, instruction2:"mov (_mem1),r1", instruction3:"mov (_mem2),r2" instruction5:"mov #0,r3", and instruction6:"mov #1,r4" are not linked by directed lines, which is to say, no dependent relations concerning the use of a resource exist between these instructions. Therefore, object code instructions that have no dependent relation with one another, such as instruction2 instruction3, instruction5, and instruction6, can be placed into the same VLIW instruction as they can be executed in parallel.

FIG. 13 shows an example of a VLIW instruction sequence that is generated by second code generation unit 9. Circled figures from ① to ⑲ in each box indicate the numbers given to each object code instruction that has been placed into a VLIW instruction. Such object code instructions are hereafter called execution code instructions. As can been seen from the figure, instruction2:"mov (_mem1),r1" and instruction3:"mov (_mem2),r2, are placed into VLIW instruction:"mov (_mem1),r1__mov (_mem2),r2" that is specified by address 0×108 in the VLIW instruction sequence. Instruction4:"add r1,r2" and instruction5:"mov #0,r3" are placed into VLIW instruction:"add r1,r2__mov #0,r3" specified by address 0×110. Further, instruction11:"add r1,r3" and instruction12:"add #1,r4" are placed into VLIW instruction:"add r1,r3__add #1,r4" specified by address 0×140, and instruction14:"mul #2,r2" and instruction17:"mov #0,r1" are placed into VLIW instruction:"mul #2,r2__mov #0,r1" specified by address 0×150. Here, instruction11:"add r1, r3" and instruction12:"add #1,r4" do not have a dependent relation with each other as shown in the DAG in FIG. 10C, although both have directed links from instruction10:"mul r4, r1".

Similarly, instruction14:"mul #2,r2" and instruction17:"mov #0,r1" do not have a dependent relation with each other as shown in the DAG in FIG. 10D, although these instructions are linked to instruction18:"restore". Second code generation unit 9 places such pairs of instructions that have no dependent relation with each other into the same VLIW instruction.

Debugging information storage unit 3 stores debugging information. Debugging information is a general name given to various kinds of information, such as correspondence information that expresses a correspondence between a line given to each original source code statement in a source program and the address of an execution code instruction to which the source code statement has been converted, optimization information that expresses processes of optimization performed by first code generation unit 7 for a program written in internal representation, and resource allocation information that shows the correspondence between variables in the source program and resources such as registers or memories. As its principal components, debugging information storage unit 3 includes line address storage unit 4 that stores sets of line address information and parallel execution information storage unit 5 that stores sets of parallel execution information.

Line address storage unit 4 stores line address information. Line address information includes line numbers given to each source code statement and relative addresses or VLIW instructions in a VLIW instruction sequence into which the source code statements are placed, so that each set of information shows a line of a source program that corresponds to a VLIW instruction in the VLTW instruction sequence. FIG. 11 shows line address information when the VLIW instructions shown in FIG. 13 are generated based on the source code statements shown in FIG. 8A and the object code instructions shown in FIG. 8B. By referring to FIG. 8B and FIG. 13, it can be seen that instruction2:"mov (_mem1),r1" is generated from Line:5 "a=mem1;", for instance. Here, as instruction2:"mov (_mem1),r1" is placed into VLIW instruction:"mov (_mem1),r1__mov (_mem2),r2" specified by the relative address 0×108 in the VLIW instruction sequence, the line number of Line:5 in FIG. 11 is associated with address 0×108 which is the relative address of VLIW instruction:"mov (_mem1),r1__mov (_mem2),r2" that stores instruction2:"mov (_mem1),r1".

Parallel execution information storage unit 5 stores parallel execution information. Parallel execution information contains relative addresses of VLIW instructions and line numbers assigned to source code statements, from which the execution code instructions to be placed into VLIW instructions have been generated, so that each set of parallel execution information expresses a correspondence between a VLIW instruction and a group of source code statements. FIG. 12 shows the parallel execution information generated based on the source code statements shown in FIG. 8A and the object code instructions shown in FIG. 8B. As can been seen by referring to FIG. 8B and FIG. 13, instruction2:"mov (_mem1),r1" is generated from Line:5 "a=mem1", and instruction3:"mov (_mem2),r2" and instruction4:"add r1,r2" are generated from Line:6 "b=a+mem2;". Here, as both instruction2:"mov (_mem1),r1" and instruction3:"mov (_mem2),r2" are placed into the same VLIW instruction:"mov (_mem1),r1__mov (_mem2),r2" specified by a relative address 0×•in the VLIW instruction sequence, the line numbers of both Line:5 and Line:6 in FIG. 12 are associated with address 0×108 which is the relative address of the VLIW instruction:"mov (_mem1),r1__mov (_mem2),r2" that stores instruction2:"mov (_mem1),r1" and instruction3:"mov (_mem2),r2".

Debugging information generation unit 10 serves as the parallel execution information generation device. After second code generation unit 9 generates a VLIW instruction sequence, debugging information generation unit 10 first judges to which VLIW instruction each source code statement written in each line of a source program corresponds and then generates line address information that it writes into line address storage unit 4 in debugging information storage unit 3. Debugging information generation unit 10 then groups together line numbers that were associated with the same relative address in line address information so as to generate parallel execution line information that it then writes into parallel execution information storage unit 5 in debugging information storage unit 3.

In the example of line address information shown in FIG. 11, since the source code statement on line 5 of the source program corresponds to the execution code instruction which is placed into address 0×108, the line address information records that Line:5 is associated with address 0×108. Similarly, since the source code statement on line 6 of the source program corresponds to the execution code instruction that is also placed into address 0×108, the line address information records that Line:6 is associated with address 0×108.

Figure 3:
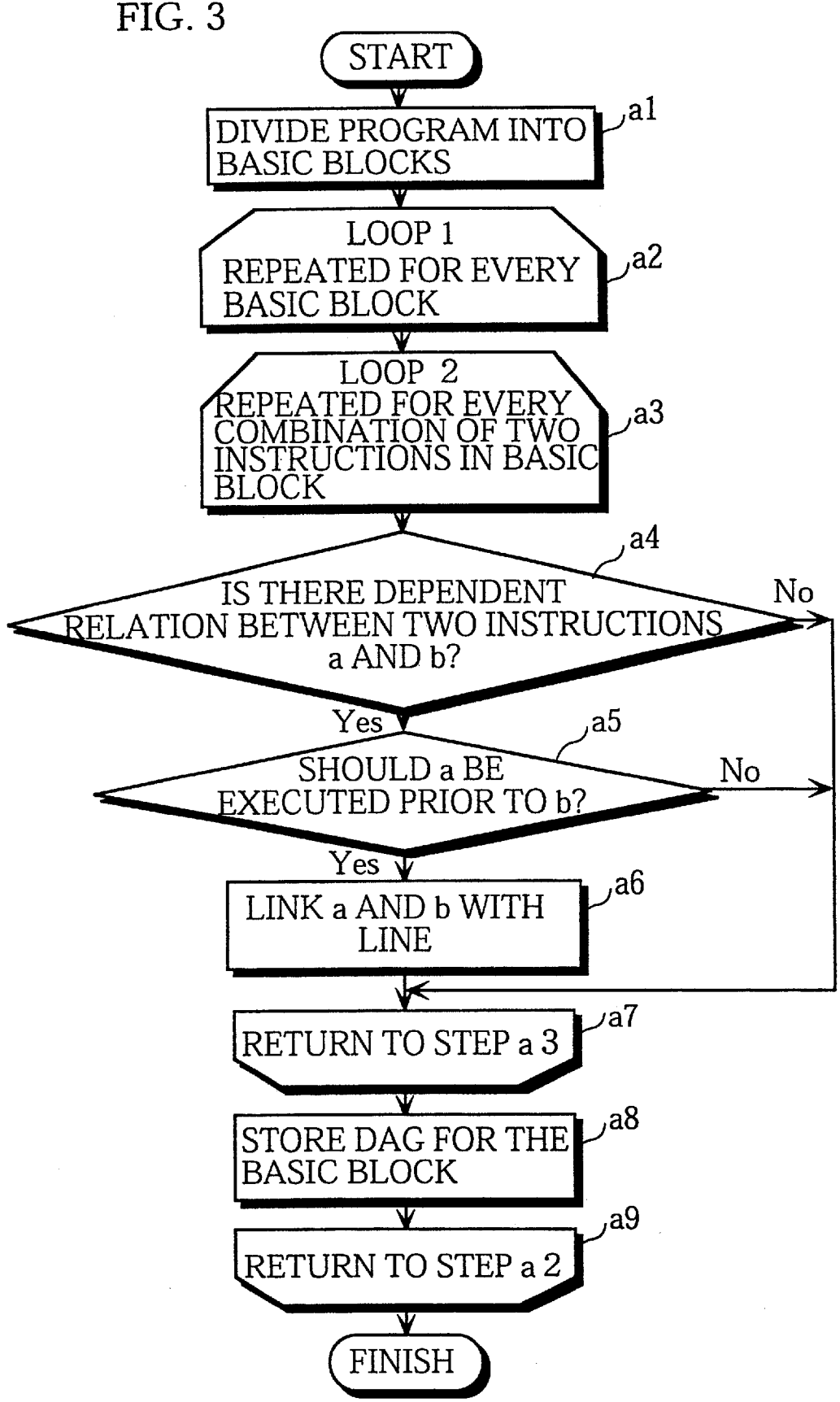
FIG. 3 is a flowchart that shows the processing of dependent relation analysis unit 8.
Figure 4:
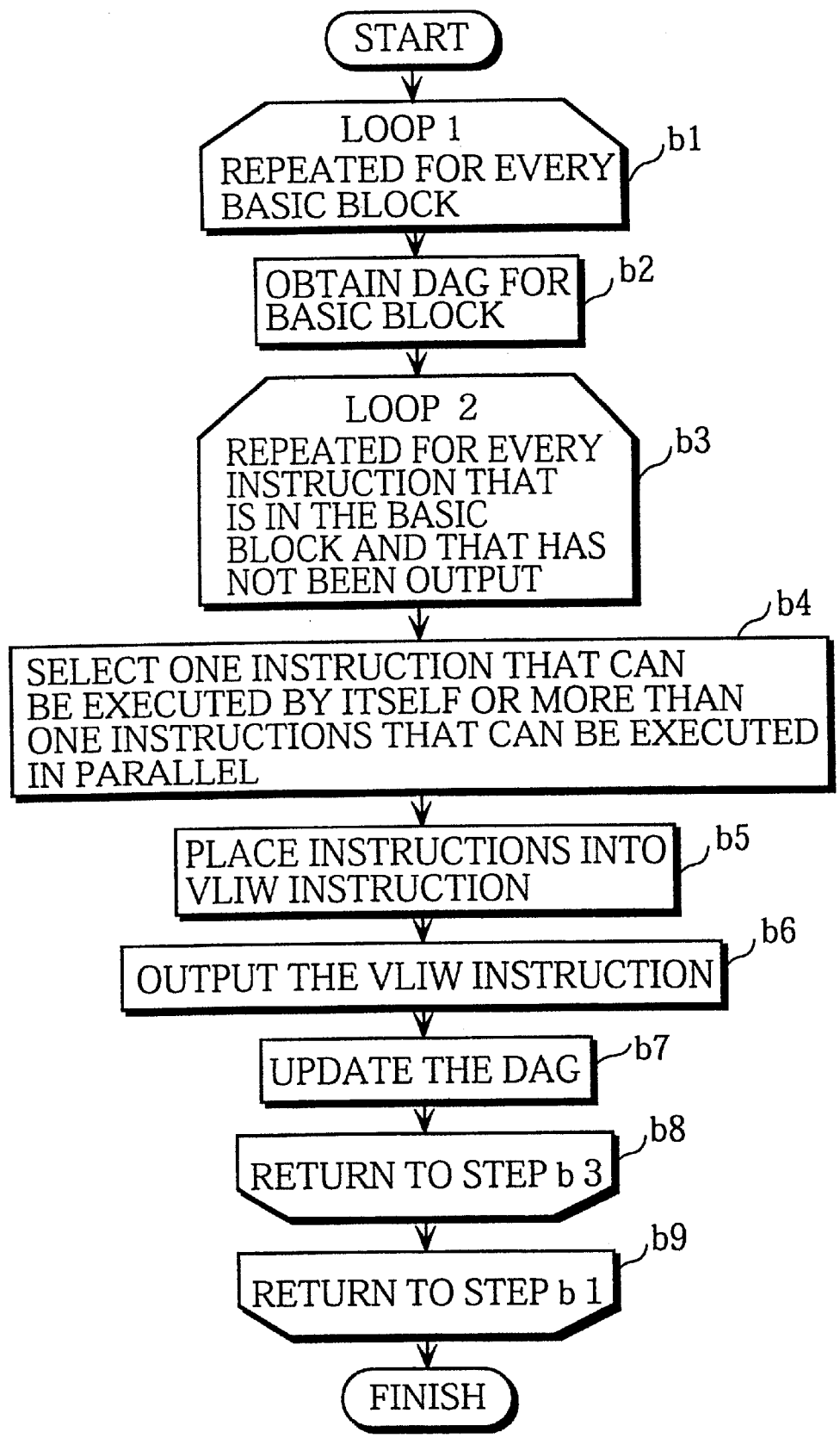
FIG. 4 is a flowchart that shows the processing of second code generation unit 9.
Figure 5:
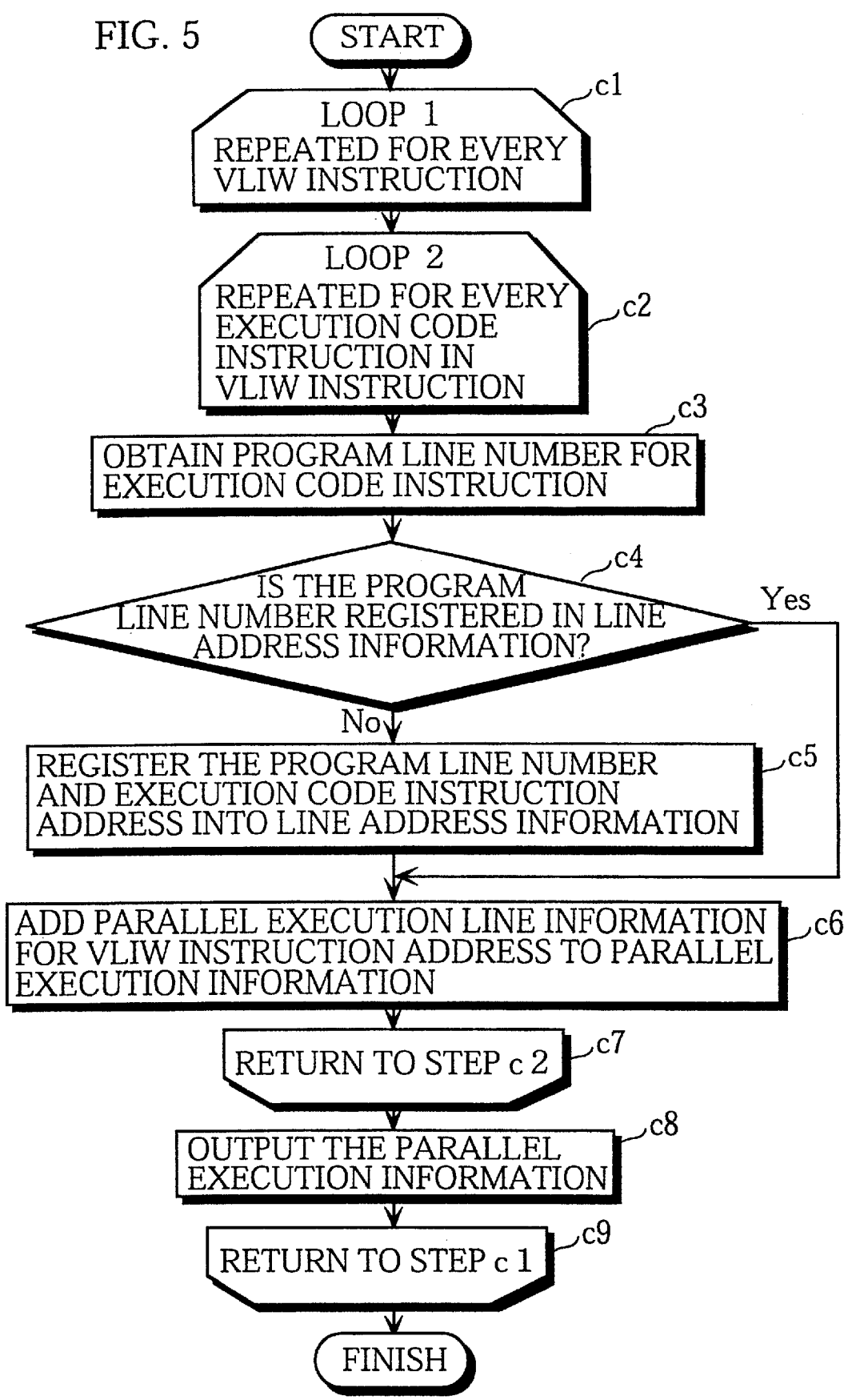
FIG. 5 is a flowchart that shows the processing of debugging information generation unit 10.

The following explains the processing described by flowcharts of FIGS. 3–5, for the specific example of the source program shown in FIG. 8A. FIG. 3 is a flowchart that shows the processing of dependent relation analysis unit 8, FIG. 4 is a flowchart for the processing of second code generation unit 9, and FIG. 5 is a flowchart for the processing of debugging information generation unit 10.

First, the source program shown in FIG. 8A is read from program storage unit 1 into internal representation conversion unit 6, where the source program is converted into a program written in internal representation. The program is transferred to first code generation unit 7 that generates the object code instruction sequence shown in FIG. 8B. Following this, dependent relation analysis unit 8 analyzes the dependent relations concerning the use of resources specified by each instruction.

In step a1 in the flowchart of FIG. 3, the program is divided into basic blocks. A basic block is an instruction sequence in which the execution order of a plurality of instructions is sequential, that is to say, a series of instructions from which and to which no branches are performed. After being divided into basic blocks, the input program becomes as shown in FIG. 9B.

In step a2, a loop is set so that the following processing is repeated for every basic block. Here, assume that the processing is first performed for basic block B1.

In step a3, a loop is set so that the following processing is repeated for every combination of two instructions in a basic block. Here, assume that instruction1:"save" which is shown in FIG. 9A and belongs to basic block B1 shown in FIG. 9B is set first, then in the following processing its relation to instruction2:"mov (_mem1),r1" is judged.

In step a4, it is judged if any dependent relation concerning the use of a resource exists between the two instructions a and b. If so, the processing moves to step a5, if not, the processing moves to step a7.

In step a5, it is judged if instruction a must be performed before instruction b. If the judgement "Yes" is given, the processing moves to step a6, if not, the processing moves to step a7.

Here, instruction1:"save" in FIG. 9A saves the held values of registers to save a state of resources before a function call. This means that instruction1 has a dependent relation to register1 specified by instruction2:"mov (_mem1),r1". Accordingly, in step a4 the judgement "Yes" is given, and the processing moves to step a5.

Then, in step a5, it is judged whether instruction a must be performed prior to instruction b. Since the saving of a held value of register r1 which is instructed by instruction1:"save" must be conducted prior to the setting of register r1 which is instructed by instruction2:"mov (_mem1),r1", in step a5 "Yes" is selected, and the processing moves to step a6.

In step a6, a line is formed from instruction a to instruction b. Then, a directed line is formed from instruction1:"save" to instruction2:"mov (_mem1),r1".

Likewise, the relations of instruction1:"save" to instruction3:"mov (_mem2),r2", instruction4:"add r1,r2", instruction5:"mov #0,r3", and instruction6:"mov #1,r4" are respectively judged. As a result, it is judged that instruction3, instruction4, instruction5, and instruction6 all have a dependent relation to instruction1, and that they all need to be performed after instruction 1:"save". Accordingly, directed lines are formed from instruction1 to instruction3, instruction4, instruction5, and instruction6, respectively.

Next, instruction2:"mov (_mem1),r1" and instruction3:"mov (_mem2),r2" are investigated. Since instruction2:"mov (_mem1),r1" and instruction3:"mov (_mem2),r2" do not use the same resources, there is no dependent relation between these two instructions. Accordingly, in step a4 "No" is selected, and the relation of the next two instructions is judged.

After this, instruction2:"mov (_mem1),r1" and instruction4:"add r1,r2" are investigated. Since instruction2:"mov (_mem1),r1" and instruction4:"add r1,r2" have dependent relation concerning register r1, in step a4, "Yes" is selected, and the processing moves to step a5.

Here, instruction2:"mov (_mem1),r1" must be executed prior to instruction4:"add r1,r2". Therefore, the judgement "Yes" is given in step a5, and the processing moves to step a6, where, after a directed line previously formed between instruction1 and instruction4 has been removed, a directed line is formed from instruction2:"mov (_mem1),r1" to instruction4:"add r1,r2".

Likewise, the relation of instruction2:"mov (_mem1),r1" to instruction5:"mov #0,r3" and to instruction6:"mov #1,r4" is respectively investigated. Since instruction2:"mov (_mem1),r1" has no dependent relation concerning the use of a resource with either instruction5:"mov #0,r3" or instruction6:"mov #1,r4", a directed line is not formed from instruction2 to either instruction5 or instruction6.

Following this, the relation of instruction3:"mov (_mem2),r2" to instruction4:"add r1,r2", instruction5:"mov #0,r3", and instruction6:"mov #1,r4" is investigated. As there is a dependent relation concerning register r2 between instruction3:"mov (_mem2),r2" and instruction4:"add r1,r2", the judgement "Yes" is given in step a4, and the processing moves to step a5. Following this, as instruction3:"mov (_mem2),r2" must be executed prior to instruction4:"add r1,r2", the judgement "Yes" is given in step a5, and the processing moves to step a6 where a directed line is formed from instruction3:"mov (_mem2),r2" to instruction4:"add r1,r2". On the other hand, instruction3:"mov (_mem2),r2" has no dependent relation either to instruction5:"mov #0,r3" or to instruction6:"mov #1,r4". Accordingly, in step a4, the judgement "No" is given, and no dependent relations are formed from instruction3 to instruction5 or to instruction6.

Finally for basic block B1, the relation between instruction5:"mov #0,r3" and instruction6:"mov #1,r4" is investigated. Since there is no dependent relation between instruction5:"mov #0,r3" and instruction6:"mov #1,r4", the judgement "No" is given in step a4, and no directed line is formed between these two instructions.

The above process finds all the dependent relations existing between instructions in basic block B1, and generates a dependency DAG for basic block B1 as shown in FIG. 10A. The circled figures in FIG. 10A correspond to those shown in FIG. 9A. Following this, the processing moves to step a8, where the generated dependency DAG for basic block B1 is stored.

The above operation concludes the processing for basic block B1. Following this, the dependent relations existing in each of basic blocks B2–B4 are analyzed in the same way so that the dependency DAGs shown in FIGS. 10B–10D are generated.

Following this, second code generation unit 9 generates a VLIW instruction sequence. FIG. 8B shows the program that is input into second code generation unit 9. The same program is input to dependent relation analysis unit 8. In FIG. 8B, a group of object instructions indicated by a mark "}" corresponds to the source code statement indicated by the line number written next to the mark "}". For example, the first instruction "save" corresponds to the source code statement on line 2 of the source program, and instructions:"mov(_mem2),r2" and "add r1,r2" correspond to the source code statement on line 6 of the program. Note that in the present embodiment, each VLIW instruction includes only two areas for storing two execution code instructions to simplify the explanation, The processing to generate a VLIW instruction sequence is explained below, based on the flowchart of FIG. 4 and the dependency DAG of FIG. 10A.

In step b1 in the flowchart, a loop is set so that the following processing is repeated for each basic block. Here, assume that the processing is first performed for basic block B1.

In step b2, second code generation unit 9 obtains the dependency DAG analyzed and generated by dependent relation analysis unit 8 for basic block B1. The dependency DAG shows the dependent relations between instructions.

In step b3, a loop is set so that the following processing is repeated for every instruction that is within basic block B1 and that has not been output to generated code storage unit 2.

In step b4, second code generation unit 9 refers to the dependency DAG for basic block B1, and selects either one instruction that can be executed by itself or two instructions that can be executed in parallel from the instructions in basic block B1. Since only instruction1:"save" can be executed in the first operation cycle, instruction1:"save" is selected.

In step b5, the instructions selected in step b4 are placed into an area of a VLIW instruction. Here, as only instruction1:"save" has been selected in step b4, instruction1 is stored in one of the two areas of a VLIW instruction, with the other area storing a nop instruction. In this way, a VLIW instruction is generated.

In step b6, the generated VLIW instruction in step b5 is output to generated code storage unit 2, where the VLIW instruction is stored.

In step b7, the dependency DAG is updated so that instructions outputted as a VLIW instruction in step b6 are removed from the DAG. Here, assume that instruction1:"save" has been output after being placed into a VLIW instruction in step b6, and that the dependency DAG has been updated so that instruction1:"save" is removed from the DAG.

Following this, the processing returns to step b4, where second code generation unit 9 refers to the dependency DAG for basic block B1 and selects either one instruction that can be executed by itself or two instructions that can be executed in parallel from instructions in basic block B1. Since instruction1:"save" has been removed from the dependency DAG, instruction2:"mov (_mem1),r1", instruction3:"mov (_mem2),r2", instruction4:"add r1,r2", instruction5:"mov 30,r3", and instruction6:"mov #1,r4" are left in the dependency DAG. Since all these instructions except for instruction4 can be executed in parallel, instruction2:"mov (_mem1),r1" and instruction3:"mov (_mem2),r2" are selected.

In step b5, instruction2:"mov (_mem1),r1" and instruction3:"mov (_mem2),r2" that have been selected in step b4 are placed into two areas of a VLIW instruction to generate a VLIW instruction. In step b6, the generated VLIW instruction is output to generated code storage unit 2, where the VLIW instruction is stored.

As instruction2:"mov (mem1),r1" and instruction3:"mov (mem2),r2" have been output as a VLIW instruction, the dependency DAG is updated so that these two instructions are removed from the dependency DAG in step b7.

Then, the processing returns to step b4, where either one instruction that can be executed by itself or two instructions that can be executed in parallel are selected from instructions in basic block B1, referring to the dependency DAG. As instruction2:"mov (_mem1),r1" and instruction3:"mov (_mem2),r2" have been removed from the dependency DAG, instruction4:"add r1, r2", instruction5:"mov #0,r3", and instruction6:"mov #1,r4" are left in the dependency DAG. Since all these instructions can be executed in parallel, here, instruction4:"add r1,r2" and instruction5:"mov #0,r3" are selected.

In step b5, instruction4:"add r1,r2" and instruction5:"mov #0,r3" that were selected in step b4 are placed into two areas of a VLIW instruction to generate a VLIW instruction. In step b6, the generated VLIW instruction is output to generated code storage unit 2, where the VLIW instruction is stored.

In step b7, since instruction4:"add r1,r2" and instruction5:"mov #0,r3" have been output as a VLIW instruction, the dependency DAG is updated so that these two instructions are removed.

The processing then returns to step b4, where either one instruction that can be executed by itself or two instructions that can be executed in parallel are selected from instructions in basic block B1, referring to the dependency DAG. As only instruction6:"mov #1,r4" is left in the dependency DAG, instruction6:"mov #1,r4" is selected.

In step b5, second code generation unit 9 inserts the selected instruction6:"mov #1,r4" into one area of a VLIW instruction and a nop instruction into the other. Following this, in step b6, the VLIW instruction is stored into generated code storage unit 2.

In step b7, the dependency DAG is updated so that instruction6:"mov #1,r4" is removed from the dependency DAG.

When the above processing is completed, all the instructions in basic block B1 have been output as VLIW instructions, which is to say, the processing of loop 2 has been completed. As a result, the processing returns to step b1, where the processing proceeds to the next basic block.

After the code generation processing above is performed for each of basic blocks B2–B4, the VLIW instruction sequence shown in FIG. 13 is stored in generated code storage unit 2.

After the above processing, debugging information generation unit 10 generates line address information that expresses correspondence between the line numbers in the source program and the addresses of execution code instructions as well as parallel execution information that expresses correspondence between the line numbers of the source code statements that can be executed in parallel and addresses in a VLIW sequence. This processing is described below referring to FIGS. 5, 11, 12, and 13.

In step c1 in the flowchart of FIG. 5, a loop is set so that the following processing is repeated for every VLIW instruction in a VLIW sequence. Following this, one VLIW instruction is selected. Here, assume that a VLIW instruction specified by address 0×100 in FIG. 13 is selected first.

In step c2, a loop is set so that the following processing is repeated for every execution code instruction included in the VLIW instruction selected in step c2. Then, one execution code instruction is selected from the VLIW instruction. Here, assume that execution code instruction:"save" is selected first for the following processing.

In step c3, the line number of the source code statement that corresponds to execution code instruction:"save" is obtained. In this case, line number "2" is obtained.

In step c4, it is judged whether the line number obtained in step c3, which is line number "2", has been already registered into line address information storage unit 4. If so, the processing moves to step c6, or if not, the processing moves to step c5. Since line number "2" has not been registered yet, the judgement "No" is given, and the processing moves to step c5.

In step c5, the obtained line number and the address of execution code instruction:"save" are associated as a set of line address information that is stored into line address storage unit 4. Here, Line:2 and address 0×100 are stored as a set of line address information into line address storage unit 4 as shown by an arrow indicated by A in FIG. 11.

In step c6, the obtained line number of the source code statement is written as parallel execution line information into a writing column of a parallel execution information list, which has also a heading column containing addresses of VLIW instructions, at a position corresponding to the address of the VLIW instruction that includes the execution code instruction corresponding to the obtained line number. Here, Line:2 is written as parallel execution line information into the writing column of the list at a position corresponding to address 0×100 in the heading column.

Following this, the processing moves to step c7, and so returns to step c2. Then, according to the loop, the same procedure is performed for the next execution code instruction:"nop" in the VLIW instruction.

Since execution code instruction:"nop", is not associated with any source code statement, the processing from step c3 to step c6 is not performed for this instruction, and the loop set in step c2 is terminated. As a result, the processing moves to step c8.

In step c8, the set of parallel execution information generated in step c6 is output to parallel execution information storage unit 5, where the set of parallel execution information is stored as shown by the arrow B in FIG. 12.

The above process completes the processing for the VLIW instruction specified by address 0×100. Following this, in step c1, the VLIW instruction specified by address 0×108 is selected, and according to the loop the following processing is performed for the VLIW instruction.

In step c2, debugging information generation unit 10 selects the execution code instruction:"mov(_mem1),r1" in the selected VLIW instruction.

In step c3, the line number "5" of the source code statement that corresponds to the selected execution code instruction is obtained.

In step c4, debugging information generation unit 10 judges whether line number "5" has already been registered in line address information. Since line number "5" has not been registered yet, the judgement "No" is given, and the processing moves to step c5.

In step c5, line number "5" and the address of the selected execution code instruction which is address 0×108 are associated as a set of line address information, that is stored into line address storage unit 4 as shown by the arrow C in FIG. 11.

In step c6, Line:5 is written as parallel execution line information into the writing column of the list at a position corresponding to address 0×108 in the heading column.

Following this, the processing moves to step c7, and then returns to step c2. Then, according to the loop, the same procedure is performed for the next execution code instruction:"mov (__mem2),r2" in the selected VLIW instruction.

In step c3, the line number "6" of the source code statement that corresponds to the selected execution code instruction is obtained.

In step c4, debugging information generation unit 10 judges whether the line number "6" has already been registered as line address information. Then, the judgement "No" is given, and the processing moves to step c5.

In step c5, line number "6" and address 0×108 of the execution code instruction are associated as a set of line address information, that is stored into line address storage unit 4, as shown by the arrow D in FIG. 11.

In step c6, Line:6 is written as parallel execution line information into the writing column of the list at a position corresponding to address 0×108 in the heading column.

The above process completes the processing for all the execution code instructions in the selected VLIW instruction. Therefore, the processing moves to step c8.

In step c8, the set of parallel execution information generated in step c6 is output to parallel execution information storage unit 5, where it is stored as shown by the arrow E in FIG. 12.

The above process completes the processing for the VLIW instruction specified by address 0×108.

When the processing that has been described above is completed for all the VLIW instructions in the VLIW instruction sequence, line address storage unit 4 stores the line address information list shown in FIG. 11, while parallel execution information storage unit 5 stores the parallel execution information list shown in FIG. 12.

Figure 2:
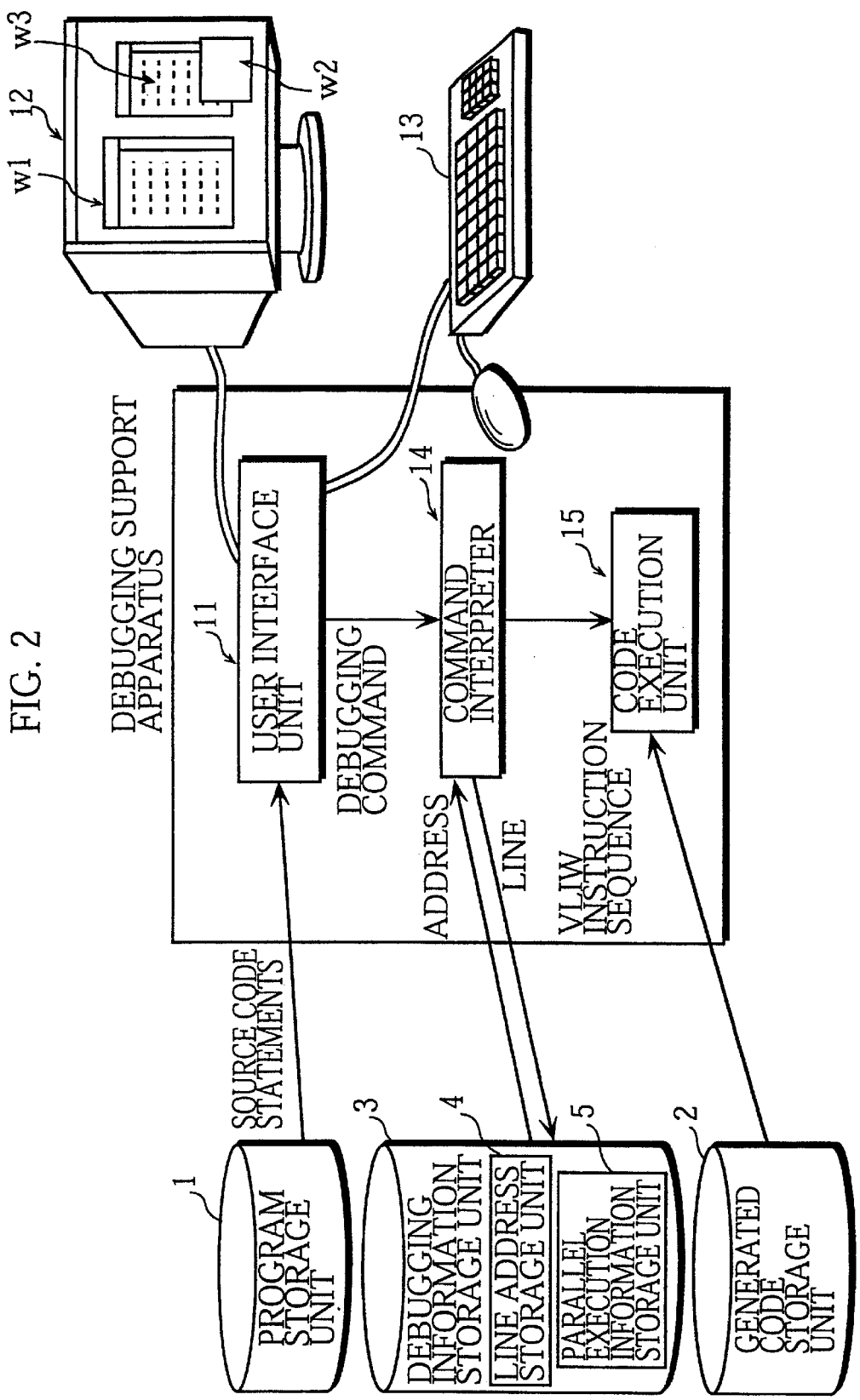
FIG. 2 shows a construction of a debugging support apparatus.

The following is the explanation of the internal construction of a debugging support apparatus. FIG. 2 shows an internal construction of the debugging support apparatus. The debugging support apparatus, which is connected to display monitor 12 and keyboard 13, comprises user interface unit 11, command interpreter 14, and code execution unit 15.

Figure 14:
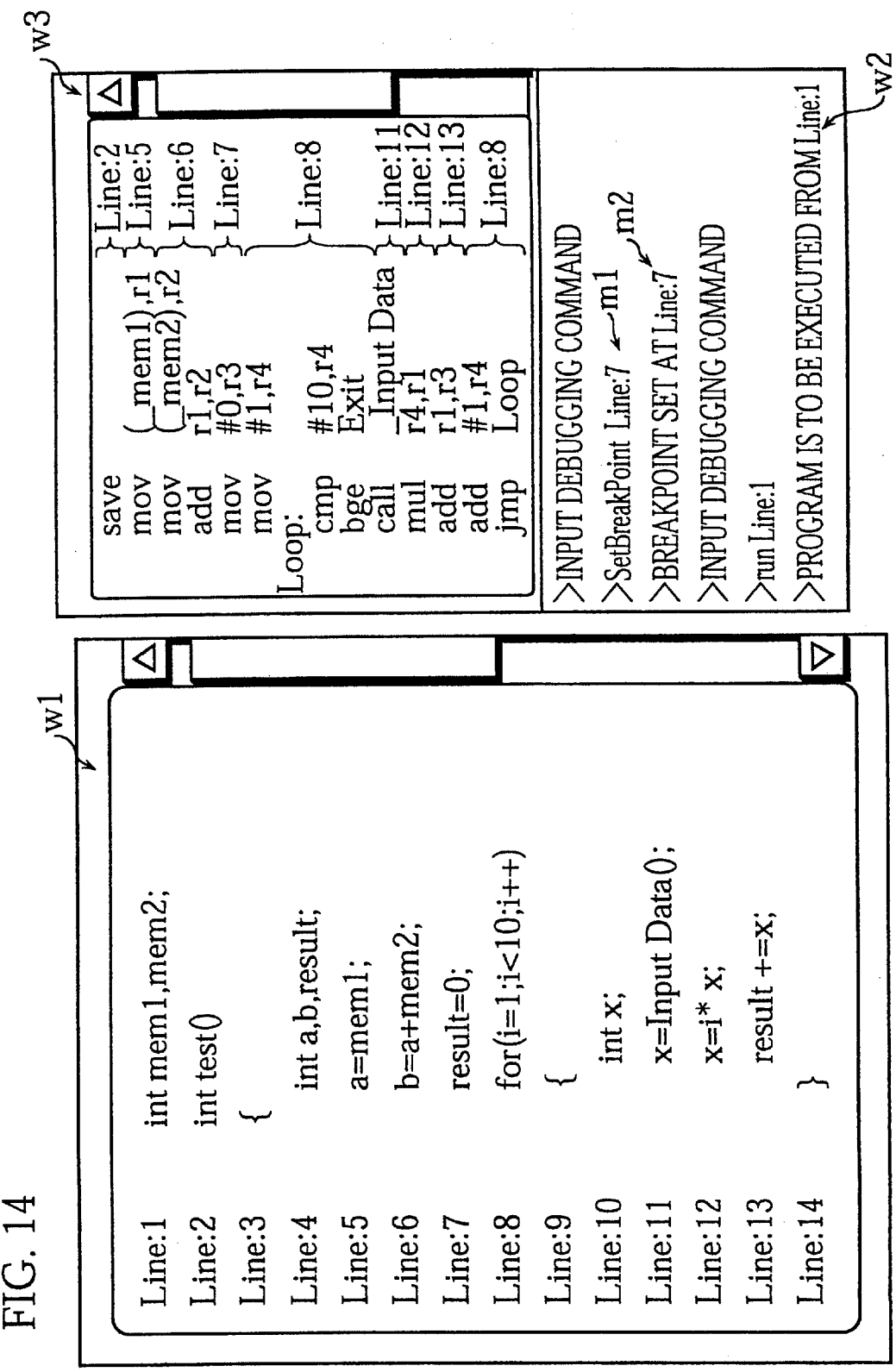
FIG. 14 shows a display screen when a user inputs a command to set a breakpoint and a command to execute a program.

User interface unit 11 provides a user with an operational environment in which display monitor 12 and keyboard 13 can be used. Here, keyboard 13 is used by the user to input debugging commands, while display screen 12 is used to visually display a source program and object code instructions via windows. FIG. 14 shows examples of windows displayed on display screen 12, which include source program window w1, command line window w2, and object code window w3. Source program window w1 is a window to display a specified part of the source program stored in program storage unit 1 as a program list, based on the user's command.

Command line window w2 displays a prompt message that prompts the user to enter a debugging command regarding the part of the source program displayed in source program window w1, echoes back an input entered by the user via command interpreter 14, and displays a message regarding the result of the execution of a debugging command performed by code execution unit 15.

Object code window w3 displays object code instructions that correspond to the part of the source program displayed in source program window w1 with each of the object code instructions being assigned a line number of a corresponding source code statement. This correspondence is represented by the mark "}" and the legend. "Line:" that accompany a number that shows the line number of an original source code statement.

When a debugging command is input to user interface unit 11 via keyboard 13, command interpreter 14 extracts the line number of the source code statement that is used in the debugging command, and judges which VLIW instruction address corresponds to the extracted line number by referring to line address storage unit 4. When a VLIW instruction address is found, command interpreter 14 controls code execution unit 15 to perform debugging for the VLIW instruction specified by this address in the VLIW instruction sequence stored in generated code storage unit 2.

Here assume that four kinds of debugging commands will be input to user interface unit 11. These are a SetBreakPoint command, a run command, a ReadVAR command, and a Step command.

The SetBreakPoint command designates a line number of a source code statement as a first operand, and sets a breakpoint at a VLIW instruction corresponding to the line number designated as the first operand.

The run command designates a line number of a source code statement as a first operand, and has a VLIW instruction sequence executed starting from the VLIW instruction that corresponds to the line number designated as the first operand.

The ReadVAR command designates a variable in the to source program as a first operand, and has a held value of a register or memory that corresponds to the variable designated as the first operand.

The Step command designates a line number that is assigned to a source code statement as a first operand, and has only the VLIW instruction that corresponds to the line number designated as the first operand executed.

Code execution unit 15 includes a simulator, an in-circuit emulator (ICE), or a monitor, and reproduces a hardware environment that is similar to a target machine. This simulated hardware environment is made to execute the VLIW instructions in the VLIW instruction sequence stored in generated code storage unit 2. There are of course differences in the hardware environment simulated by these different methods. A monitor and ICE are capable of providing a hardware environment that is equal or very similar to the target machine, while a simulator only simulates the hardware environment of the target machine on a host computer. However, a monitor, ICE, or a simulator are all capable of simulating a hardware environment of a target machine that contains a program counter, a register, and a memory.

Figure 6:
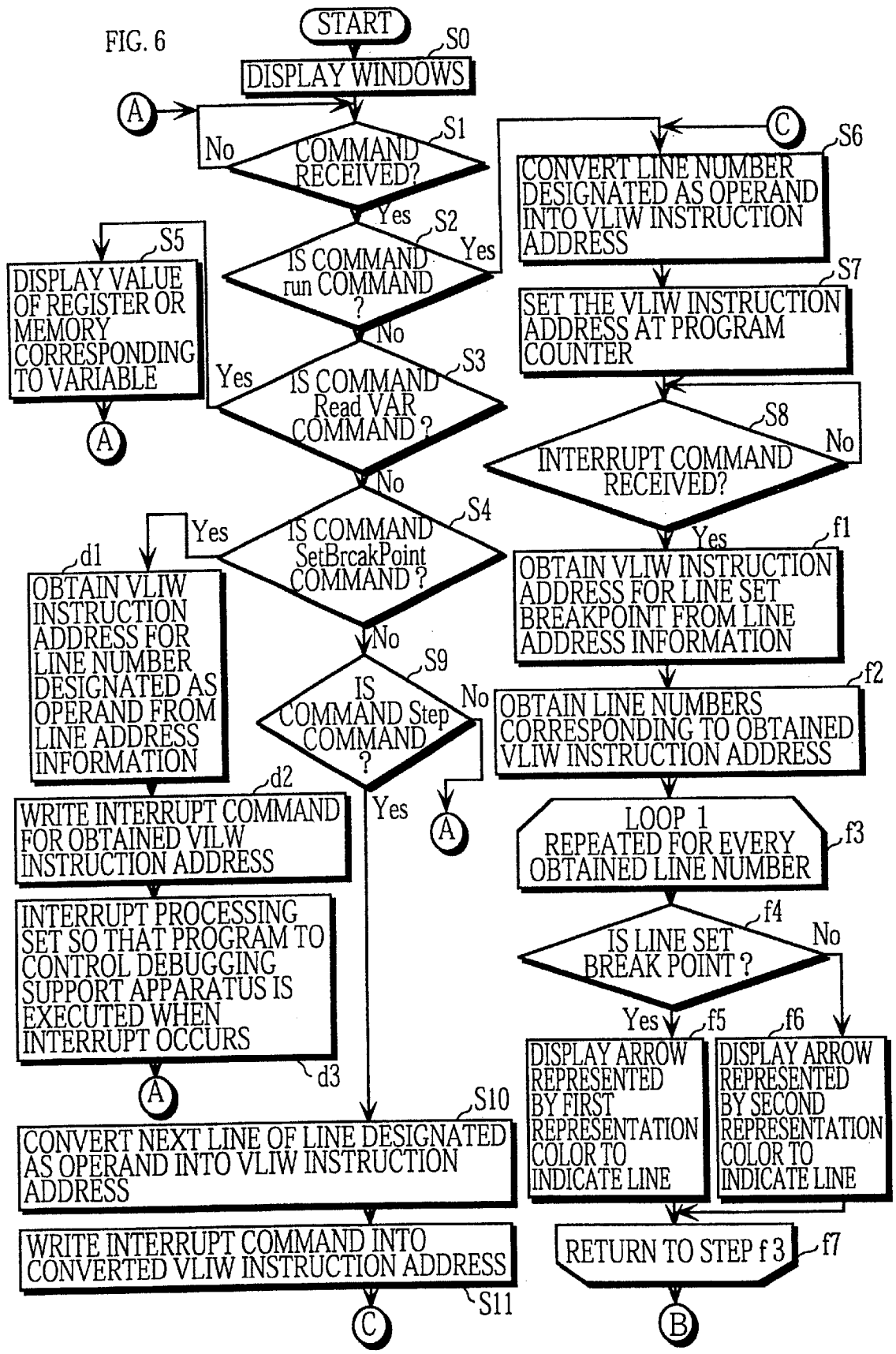
FIG. 6 is a flowchart that shows the processing of command interpreter 14.

The processing of command interpreter 14 when it receives the four kinds of commands stated above is described in the flowchart of FIG. 6. The following explains the processing of the flowchart with reference to specific display examples shown in FIGS. 14, 15A–B, and 16A–C.

In step S0, source program window w1, command line window w2, and object code window w3 are displayed on display screen 12. Then, command interpreter 14 displays a prompt that prompts the user to specify a part of the source program in command line window w2, and waits for a user input. When the user inputs a specification of a part of the source program, the corresponding part is displayed as a program list in source program window w1. Following this, the processing moves to step S1.

In step S1, command interpreter 14 waits for the input of a debugging command to user interface unit 11. When such input is made, the processing moves to step S2.

In step S2, it is judged whether the input debugging command is a run command. If so, the processing moves to step S6, and if not, the processing moves to step S3.

In step S3, it is judged whether the input debugging command is a ReadVAR command. If so, the processing moves to step S5, and if not, the processing moves to step S4.

In step S4, it is judged whether the input debugging command is a SetBreakPoint command. If so, the processing moves to step d1, and if not, the processing moves to step S9.

In step S9, it is judged whether the input debugging command is a Step command. If so, the processing moves to step S10, and if not, the processing returns to step S1.

In step d1, the address of a VLIW instruction that corresponds to the line number designated as an operand of SetBreakPoint command is obtained from line address storage unit 4. Here, assume that a SetBreakPoint command that designates Line:7 "result=0:" as an operand has been input as shown by m1 in FIG. 14. As a result, address 0×110 is obtained as the corresponding VLIW instruction address.

In step d2, an interrupt command is written into the obtained VLIW instruction address so that an interrupt occurs at least one execution code specified by the VLIW instruction address. In this case, an interrupt command is written into the front of address 0×110.

In step d3, the interrupt processing is set so that when an interrupt has occurred the processing is switched to a program that controls the debugging support apparatus. When this is complete, a message showing that a breakpoint has been set at Line:7 is displayed as shown by m2 in FIG. 14. Then, the processing returns to step S1, where the input of a debugging command is awaited. Here, assume that the user inputs a run command that designates Line:1 as an operand. Then, the "Yes" judgement is given in steps S1 and S2, and the processing advances to step S6.

In step S6, the line number designated as the operand is converted into a VLIW instruction address.

In step S7, the converted VLIW instruction address is set in the program counter of code execution unit 15.

In step S8, an interrupt in the processing of code execution unit 15 is awaited. When an interrupt in the processing of code execution unit 15 occurs at the set breakpoint, the processing moves to step f1.

In step f1, the address of the VLIW instruction that corresponds to the line set the breakpoint is obtained from line address storage unit 4. Here, since the breakpoint has been set at the line corresponding to address 0×110 by the previous input of SetBreakPoint command, address 0×110 is obtained from line address storage unit 4.

In step f2, parallel execution line information corresponding to the VLIW address obtained in step f1 is extracted from parallel execution information storage unit 5. Here, parallel execution line information corresponding to the obtained address 0×110 is extracted. As a result, Line:6 "b=a+mem2;" and Line:7"result=0;" are obtained from line address storage unit 4.

In step f3, a loop is set so that the processing from steps f4 to f6 will be repeated for every line included in the obtained parallel execution line information. Here, the lines included in the parallel execution line information corresponding to address 0×110 are Line:6 "b=a+mem2;" and Line:7 "result=0;", which means that the processing from steps f3 to f7 will be repeated twice.

In step f4, it is judged whether either of the obtained lines included in the parallel execution line information has been set a breakpoint. If so, the processing moves to step f5, where an arrow in a first display color is displayed next to the displayed line. If not, the processing moves to step f6, where an arrow in a second display color is displayed likewise.

Here, when it is assumed that the first display color is black and the second display color is white, Line:7 "result=0" that is set the breakpoint is indicated by a black arrow, while Line:6 "b=a+mem2;" that is to be executed in parallel is indicated by a white arrow, as shown by arrows y1 and y2 in FIG. 15A.

Figure 7:
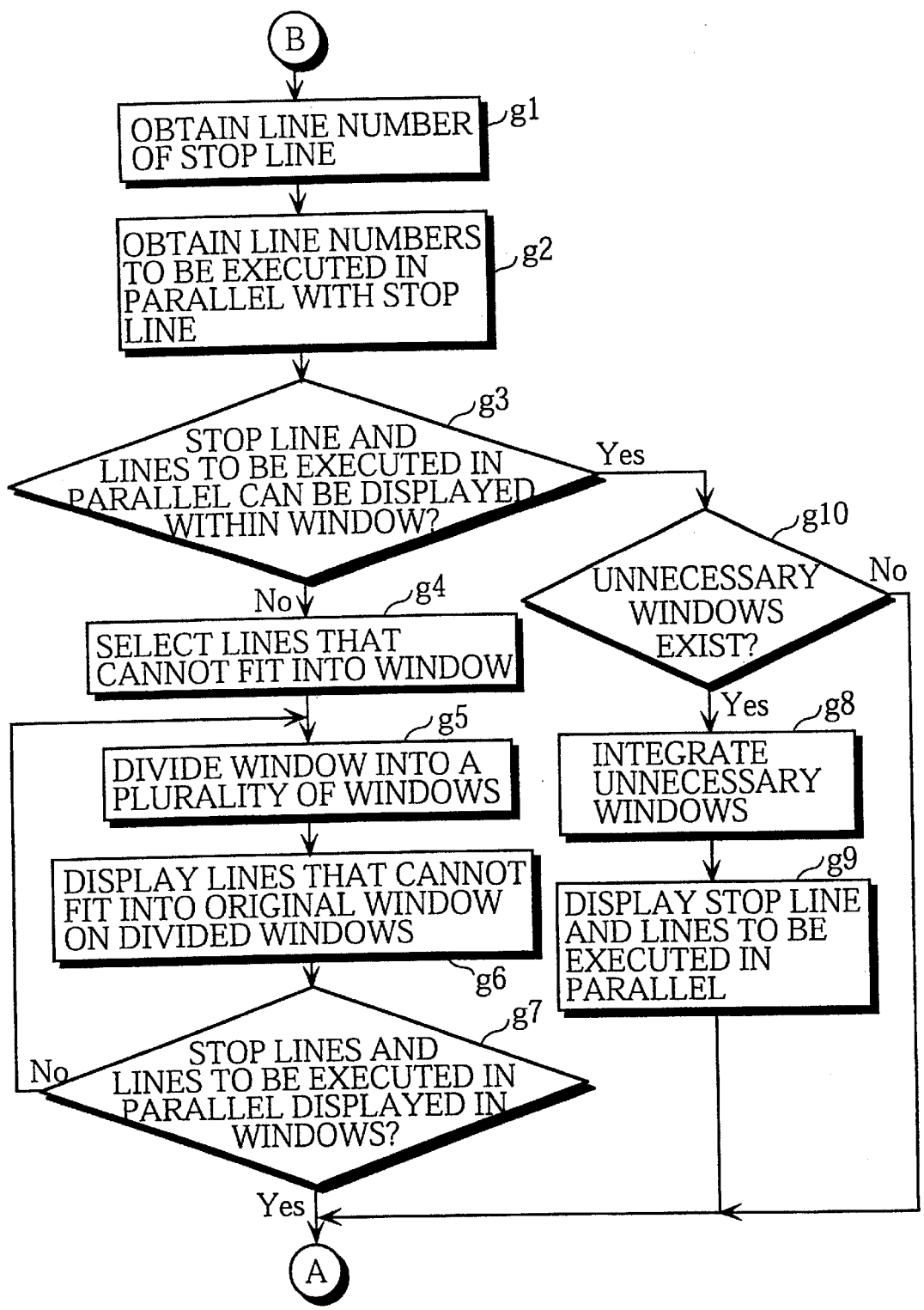
FIG. 7 is also a flowchart that shows the processing of command interpreter 14.

Following this, the processing advances to the processing shown in the flowchart of FIG. 7. In step g1, the line number of the source code statement that was previously set the breakpoint is obtained. Hereafter, a line set a breakpoint is called a stop line.

In step g2, command interpreter 14 refers to the VLIW address corresponding to the stop line and extracts line numbers of source code statements that are to be executed with the stop line from the parallel execution information. Here, command interpreter 14 searches line address storage unit 4 for the execution code instruction address corresponding to the present stop line of line 7, and obtains address 0×110. Command interpreter 14 then searches parallel execution information storage unit 5 for parallel execution line information corresponding to address 0×110, and finds lines 6 and 7. Of these, line 6 is recognized as a line that is not the present stop line.

In step g3, it is judged whether the source code statement set as the stop line and the source code statements that are executed in parallel with the stop line can be simultaneously displayed within the source program window w1 If so, the processing moves to step g10, and if not, the processing moves to step g4. When it is assumed that 25 lines can be simultaneously displayed in source program window w1, Line:6 "b=a+mem2" and Line:7 "result=0;" can be simultaneously displayed within the source program window w1. Therefore, the judgement "Yes" is given in step g3.

On the other hand, if the judgement "No" is given in step g3, the processing moves to step g4, where either the stop line or lines to be executed in parallel with the stop line that cannot fit into the source program window w1 are selected.

In step g5, the window currently displayed is divided into a plurality of windows.

In step g6, the lines selected in g4 are displayed in the windows produced by the division.

In step g7, it is judged whether the stop line and the lines to be executed in parallel have all been displayed in the windows in source program window w1. If so, the process to change the representation pattern of source program window w1 is completed. The processing then returns to step S1. If the judgement "No" is given, the processing moves to step g5, where source program window w1 that was divided into a plurality of windows is further divided.

When the "Yes" judgement is given in step g3, the processing moves to step g10, where it is judged whether unnecessary windows exist. If not, the processing moves to step S1 in FIG. 6. On the other hand, a "Yes" judgement can be given, such as when a plurality of windows that were previously necessary to display a stop line and lines to be executed in parallel are no longer needed since the current stop line and lines to be executed in parallel can be displayed within one window. In such a case, the "Yes" judgement is given in step g10, and the processing moves to step g8.

In step g8, unnecessary windows are integrated so that fewer windows are displayed on the display screen.

In step g9, the stop line and lines to be executed in parallel are displayed on the display screen. Following this, the processing moves to step S1, where an input of a debugging command is awaited. Here, assume that a ReadVAR command that designates variable "a" as an operand is input In this case, the "Yes" judgement is given in step S1, the "No" judgement is given in step S2, and the "Yes" judgement is given in step S3. As a result, the processing moves to step S5, where a register or a memory corresponding to variable "a" is accessed and its held value is obtained and displayed on the display screen. The processing then returns to step S1.

In step S1, an input of a debugging command is awaited. Heres assume that a Step command that designates Line:8 "for(i=1;i<10;i++);" as an operand is input. In this case, the "Yes" judgement is given in step S1, and the processing moves to step S2, S3, and S4 as "No" judgements are given in all these three steps. Then the processing moves to step S9, where the "Yes" judgement is given, so that the processing moves to step S10.

In step S10, the line number following the line number designated as an operand is converted into a corresponding VLIW instruction address. As Line:11 "x=Input Data( )" is the next source code statement, Line:11 is converted into a VLIW instruction address and address 0×130 is obtained. In step S11, an interrupt command is written into the VLIW instruction specified by address 0×130. The processing then moves to step S6, from which the processing in steps S7–S8, f1–f7, and g1–g9 is performed, as when a run command is executed. It should be noted here that a breakpoint may be set on the line designated by a Step command, although in the present embodiment a breakpoint is set on the line that follows the line designated by a Step command.

In step S6, Line:8 "for(i=1;i<10;i++);" which has been designated as an operand of a Step command is converted into the VLIW instruction addresses 0×118, 0×120, and 0×128. Then, in step S7, these addresses are set one at a time in the program counter of code execution unit 15 so that only the instructions specified by these addresses are executed by code execution unit 15. As a result, as shown in FIG. 15B, an arrow is displayed next to Line:8 "for(i=1;i<10;i++);" in source program window w1, while in object code window w3 three arrows are displayed next to instruction6:"mov #1 ,r4", instruction7:"cmp #10,r4", and instruction8:"bge Exit", which are respectively specified by address 0×118, address 0×120, and address 0×128. The processing then returns to step S1.

When an input is being awaited in step S1, assume that a Step command that designates Line:11 "x=Input Data( )" as an operand is input. Then, the processing proceeds through steps S2, S3, S4, S9, S10, S11, and S6. In step S6, Line:11 "x=Input Data( )" is converted into the VLIW instruction address 0×130. Then, in step S7, address 0×130 is set in the program counter of code execution unit 15 so that the VLIW instruction specified by this address is executed. As a result, as shown in FIG. 16A, an arrow is displayed next to Line:11 "x=Input Data( )" in source program window w1, while in object code window w3 another arrow is displayed next to instruction9:"call _Input Data" which is specified by address 0×130. The processing then returns to step S1.

When an input is awaited in step S1, assume that a Step command that designates Line:12 "x=i*x;" as an operand is input. After the "Yes" judgement is given in step S1, the processing proceeds through steps S2, S3, S4, S9, S10, S11, and S6. In step S6, Line:12 "x=i*x;" is converted into the VLIW instruction address 0×138. Then, in step S7, address 0×138 is set in the program counter of code execution unit 15 so that the VLIW instruction specified by this address is executed. As a result, as shown in FIG. 16B, an arrow is displayed next to Line:12 "x=i*x;" in source program window w1, while in object code window w3 another arrow is displayed next to instruction10:"mul r4,r1" which is specified by address 0×138. The processing then returns to step S1.

When an input is awaited in step S1, assume that a Step command designating Line:13 "result +=x;" as an operand is input. After the "Yes" judgement is given in step S1, the processing proceeds through steps S2, S3, S4, S9, S10, S11, and S6. In step S6, command interpreter 14 refers to the line address information and converts Line:13 "result +=x;" into the VLIW instruction address 0×140. Then, in step S7, address 0×140 is set in the program counter of code execution unit 15 so that the VLIW instruction specified by this address is executed. AS a result, since the VLIW instruction specified by address 0×140 stores two execution code instructions of instruction11:"add r1,r3" and instruction 12:"add 31,r4", two arrows are displayed next to instruction11:"add r1,r3" and instruction 12:"add 31,r4" in object code window w3, while in source program window w1, another two arrows are displayed next to source code statements of Line:8 "for(i=1;i<10;i++);" and Line:13 "result +=x;". This is shown in FIG. 16C.

As described above, parallel execution information storage unit 5 stores parallel execution information that associates each VLIW instruction with the line numbers of every source code statement that has been inserted into the VLIW instruction during compiling, when a debugging command that indicates one of the source code statements in the source program using a line number is inputted, code execution unit 15 executes VLIW instructions according to the debugging commend. This means that the user is provided with an operational environment at the level of the source program, but at the same time is still made aware of which source code statements are being performed in parallel.

Consequently, if the compiler schedules instructions based on an advanced analysis of parallelism and so generates a VLIW instruction sequence that is far removed from the source program written by the programmer, the programmer will still be able to readily understand which source code statements are executed in parallel.

When an error is found in a VLIW instruction sequence during operation verification, the programmer can easily detect which source code statement he or she wrote is the cause of the error, which increases the efficiency of debugging.

Accordingly, the present embodiment can achieve the equivalent of a high-level language-oriented development environment, wherein all processes from the coding of the program to the testing on the actual appliance is performed using a high-level language, even when object code instructions are stored in a VLIW instruction sequence.

APPLICATION EXAMPLE

The present application example can be used when the scheduling is performed for instructions that belong to different basic blocks, which is to say, when "global scheduling" is performed for source code statements. In such a case, the parallel execution information generation device of a compiler generates parallel execution information that includes "global scheduling" information, and the debugging support apparatus displays, based on the parallel execution information, an indication showing that "global scheduling" is performed for a source code statement.

A specific example of a "global scheduling" method is performed by a "speculative instruction move" method, that is described in detail in the 1996.6.3 No.663 issue of *Nikkei Electronics*. In this method, compensatory codes called "bookkeeping codes" are inserted and instructions are speculatively moved to other basic blocks. When such speculative instruction moves are used as one example of a "global scheduling" method that may be performed by the generation unit 10 adds an indication to the line numbers of source code statements that have been speculatively moved to another basic block to show such line numbers are speculative. Debugging information generation unit 10 then generates parallel execution information that associates VLIW instruction addresses with the line numbers (with such indication if present) of source code statements and stores the parallel execution information in parallel execution information storage unit 5.

When a debugging command designating a line number of a source code statement that has been speculatively moved is input or when a source code statement that has been speculatively moved is executed in parallel with other source code statements, command interpreter 14 of the debugging support apparatus refers to parallel execution information storage unit 5 and displays, via user interface unit 11, indications that show certain source code statements have been speculatively moved.

Thus, with the present application example, even when an optimized VLIW instruction sequence is generated by performing "global scheduling" on source code statements, debugging operations can be supported since the information regarding the "global scheduling" is provided.

It should be noted here that the present embodiment describes the case when one VLIW instruction stores two execution code instructions, although the number of execution code instructions stored into one VLIW instruction is not limited to two, and can be 4 or more.

Also, in the present embodiment, an arrow is used to indicate a line at which a breakpoint is set, although other marks may be used.

A line set a breakpoint is distinguished from lines that are to be executed in parallel with the line using different colored arrows on the display screen, although different marks may be used.

In the present embodiment, a window on the display screen is divided when a line set a breakpoint and lines that are to be executed in parallel with the line cannot be displayed at the same time in the window, although these lines may be simultaneously displayed on the display screen by generating new windows and displaying each of these lines in these windows, without dividing the original window.

Finally, the processing of command interpreter 14 and the processing of debugging information generation unit 10 in the present embodiment, which have been shown in the flowcharts of FIGS. 3–7, may be achieved by machine language programs, which may be stored into a recording medium such as an IC card, an optical disc, or a floppy disk that can be distributed and marketed. The machine language programs stored on such a storage medium can be used by installing the program into a general purpose computer, which sequentially executes the installed machine language program to achieve the functions of the debugging support apparatus and the parallel execution information generation device that are described in the present embodiment.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A debugging support apparatus that supports operation verification by a user for a long word instruction sequence containing at least one long word instruction, comprising:

a first storage unit for storing sets of parallel execution information that each contain a long word instruction address and a group of line numbers that each specify a source code statement in a source program, wherein source code statements specified by the group of line numbers can be executed in parallel and have been placed into the long word instruction after being translated into object code;

a reception unit for receiving from a user an operation verification command that designates a line number specifying a source code statement;

a reading unit for reading, when a set of parallel execution information that contains the designated line number exists, the set of parallel execution information from the first storage unit; and a display unit for visually indicating at least one source code statement specified by a line number in the read set of parallel execution information aside from the designated line number, wherein at least one line number in the sets of parallel execution information is assigned information for scheduling, wherein the display unit includes a scheduling information display unit for displaying, when a line number of a source code statement that is displayed by the first list display unit and the second list display unit has been assigned information for scheduling, an indication showing that the source code statement has been assigned the information for scheduling.

2. The debugging support apparatus of claim 1, wherein the display unit includes:

a first list display unit for displaying a first program list that contains the source code statement specified by the designated line number;

a second list display unit for displaying a second program list that contains a source code statement specified by a line number in the read set of parallel execution information aside from the designated line number; and a modification unit for modifying a display by the second list display unit of the source code statement that is specified by the line number in the read set of parallel execution information.

3. The debugging support apparatus of claim 2, comprising an execution control unit for having a processor execute a long word instruction, wherein the modification unit in the display unit modifies displays of different source code statements as execution of the long word instruction sequence by the processor proceeds.

4. The debugging support apparatus of claim 3, wherein one kind of operation verification command is an execution command that has the long word instruction sequence executed, the execution command designating a line number of a source code statement as a start line for execution of the long word instruction sequence, wherein the reading unit reads a set of parallel execution information containing the line number designated as the start line from the first storage unit, wherein the modification unit modifies, in program lists, a display of source code statements specified by line numbers in the read set of parallel execution information, wherein the execution control unit has the processor execute the long word instruction sequence starting from a long word instruction that corresponds to the line number designated as the start line.

5. The debugging support apparatus of claim 4, wherein another kind of operation verification command is a breakpoint setting command that has a breakpoint set at a line number, the debugging support apparatus comprising, breakpoint setting unit for setting a breakpoint at a long word instruction address associated by a set of parallel execution information with the line number to be set a breakpoint, wherein the modification unit modifies, when execution of the long word instruction sequence is interrupted by the breakpoint set by the breakpoint setting unit, a display of source code statements specified by line numbers in the set of parallel execution information.

6. The debugging support apparatus of claim 5, wherein the display unit includes a window open/close unit for opening a window according to a window open/close command, wherein the first list display unit and the second list display unit send a window open/close command so that the window open/close unit opens a window and place in the window the first program list and the second program list.

7. The debugging support apparatus of claim 6, wherein the first list display unit sends the window open/close command so that the window open/close unit opens the window, and places in the window the first program list, wherein the second list display unit includes a first judgment unit for judging whether a space of a certain size has been left in the window after the first program list has been placed, and, when no space of the certain size is left, sends a window open/close command so that the window open/close unit opens a new window and places in the new window the second program list.

8. The debugging support apparatus of claim 6, wherein the window open/close unit includes a window dividing unit for dividing a window according to a window dividing command, wherein the first list display unit sends a window open/close command so that the window open/close unit displays a window, and places in the window the first program list, wherein the second list display unit includes a second judgment unit for judging whether a space of a certain size has been left in the window after the first program list has been placed, and when no space of the certain size is left, (1) sends a window dividing command so that the window dividing unit divides the window into a plurality of windows and (2) places the second program list in a window newly produced by division by the window dividing unit.

9. A parallel execution information generation device that generates the sets of parallel execution information used in the debugging support apparatus of claim 1, comprising:

second storage unit that includes a heading column containing a plurality of addresses of long word instructions in the long word instruction sequence and a writing column that corresponds to the addresses of the long word instructions;

third storage unit for storing line numbers of source code statements in the source program and a plurality of instructions that have been translated from the source code statements;

extracting unit for extracting a long word instruction from the long word instruction sequence;

detecting unit for detecting a source code statement that corresponds to each instruction stored in the extracted long word instruction;

writing unit for writing a line number of every detected source code statement into the writing column in the second storage unit at a position corresponding to an address of the extracted long word instruction in the heading column; and control unit for controlling, after a line number of every detected source code statement is written into the second storage unit, the extracting unit to extract a next long word instruction from the long word instruction sequence, wherein, when all the long word instructions in the long word instruction sequence have been extracted by the extracting unit, the sets of parallel execution information, each of which contains one address of a long word instruction in the heading column and a group of line numbers in the writing column that correspond to the address of the long word instruction, are generated.

10. The parallel execution information generation device of claim 9, comprising a judgment unit disposed for judging, after the detecting unit detects a source code statement that corresponds to each instruction stored in the extracted long word instruction, whether the detected source code statement has been assigned information for scheduling, wherein the writing unit writes, when the judged source code statement has been assigned information for scheduling, the information for scheduling along with a line number of the detected source code statement into the writing column in the second storage unit at a position corresponding to an address of the extracted long word instruction in the heading column.

11. A computer-readable recording medium storing a debugging support program that supports operation verification by a user for a long word instruction sequence containing at least one long word instruction, wherein a computer that executes the debugging support program includes first storage unit for storing sets of parallel execution information that each contain a long word instruction address and a group of line numbers that each specify a source code statement in a source program, wherein source code statements specified by the group of line numbers can be executed in parallel and have been placed into the long word instruction after being translated into object code, wherein the debugging support program comprises:

receiving from a user an operation verification command that designates a line number specifying a source code statement;

reading, when a set of parallel execution information that contains the designated line number exists, the set of parallel execution information from the first storage unit; and displaying at least one source code statement specified by a line number in the read set of parallel execution information aside from the designated line number, wherein at least one line number in the sets of parallel execution information is assigned information for scheduling, wherein the display step includes a scheduling information display step for displaying, when a line number of a source code statement that is displayed by the first list display step and the second list display step has been assigned information for scheduling, an indication showing that the source code statement has been assigned the information for scheduling.

12. The computer-readable recording medium of claim 11, wherein the last step thereof includes:
displaying a first program list that contains the source code statement specified by the designated line number;
displaying a second program list that contains a source code statement specified by a line number in the read set of parallel execution information aside from the designated line number; and
modifying the second program list of the source code statement that is specified by the line number in the read set of parallel execution information.

13. The computer-readable recording medium of claim 12, further comprising a step for executing a long word instruction,
wherein the modifying a display step includes modifying displays of different source code statements as execution of the long word instruction sequence by the processor proceeds.

14. The computer-readable recording medium of claim 13, wherein one kind of operation verification command is an execution command that has the long word instruction sequence executed, the execution command designating a line number of a source code statement as a start line for execution of the long word instruction sequence,
reading a set of parallel execution information containing the line number designated as the start line from the first storage unit,
modifying, in program lists, a display of source code statements specified by line numbers in the read set of parallel execution information,
the processor executing the long word instruction sequence starting from a long word instruction that corresponds to the line number designated as the start line.

15. The computer-readable recording medium of claim 14, wherein another kind of operation verification command is a breakpoint setting command that has a breakpoint set at a line number,
the debugging support program comprising
setting a breakpoint at a long word instruction address associated by a set of parallel execution information with the line number to be set a breakpoint,
modifying, when execution of the long word instruction sequence is interrupted by the breakpoint set by the breakpoint setting step, a display of source code statements specified by line numbers in the set of parallel execution information.

16. The computer-readable recording medium of claim 15, wherein the display step includes a window open/close substep for opening a window according to a window open/close command,
wherein the first list display step and the second list display includes sending a window open/close command so that the window open/close step opens a window and places in the window the first program list and the second program list.

17. The computer-readable recording medium of claim 16, wherein the first list display step further includes the step of sending the window open/close command so that the window open/close substep opens the window, and places in the window the first program list,
wherein the second list display step includes judging whether a space of a certain size has been left in the window after the first program list has been placed, and, when no space of the certain size is left, sends a window open/close command so that the window open/close step opens a new window and places in the new window the second program list.

18. The computer-readable recording medium of claim 16, wherein the window open/close substep includes a window dividing substep for dividing a window according to a window dividing command,
wherein the first list display step sends a window open/close command so that the window open/close step displays a window, and places in the window the first program list,
wherein the second list display step includes judging whether a space of a certain size has been left in the window after the first program list has been placed, and when no space of the certain size is left, (1) sending a window dividing command so that the window dividing step divides the window into a plurality of windows and (2) placing the second program list in a window newly produced by division by the window dividing step.

19. A computer-readable recording medium storing a parallel execution information generation program that generates the sets of parallel execution information used in the debugging support program of claim 11,
wherein a computer that executes the parallel execution information generation program comprising
a second storage unit that includes a heading column containing a plurality of addresses of long word instructions in the long word instruction sequence and a writing column that corresponds to the addresses of the long word instructions and
a third storage unit for storing line numbers of source code statements in the source program and a plurality of instructions that have been translated from the source code statements,
wherein the parallel execution information generation program comprises:
extracting a long word instruction from the long word instruction sequence;
detecting a source code statement that corresponds to each instruction stored in the extracted long word instruction;
writing a line number of every detected source code statement into the writing column in the second storage unit at a position corresponding to an address of the extracted long word instruction in the heading column; and
controlling, after a line number of every detected source code statement is written into the second storage unit, the extracting step to extract a next long word instruction from the long word instruction sequence,
wherein, when all the long word instructions in the long word instruction sequence have been extracted by the extracting step, the sets of parallel execution information, each of which contains one address of a long word instruction in the heading column and a group of line numbers in the writing column that correspond to the address of the long word instruction, are generated.

20. The computer-readable recording medium of claim 11, wherein the parallel execution information generation program comprises a judging, after the detecting step detects a source code statement that corresponds to each instruction stored in the extracted long word instruction, whether the detected source code statement has been assigned information for scheduling, writing, when the judged source code statement has been assigned information for scheduling, the information for scheduling along with a line number of the detected source code statement into the writing column in the second storage unit at a position corresponding to an address of the extracted long word instruction in the heading column.

* * * * *